US012712132B2

(12) United States Patent
Yamakawa et al.

(10) Patent No.: US 12,712,132 B2
(45) Date of Patent: Aug. 18, 2026

(54) CAPACITOR

(71) Applicant: NICHICON CORPORATION, Kyoto (JP)

(72) Inventors: Yoshiyuki Yamakawa, Kyoto (JP); Naoya Naito, Kyoto (JP)

(73) Assignee: NICHICON CORPORATION, Kyoto (JP)

( * ) Notice: Subject to any disclaimer, the term of this patent is extended or adjusted under 35 U.S.C. 154(b) by 134 days.

(21) Appl. No.: 18/836,086

(22) PCT Filed: Jun. 20, 2023

(86) PCT No.: PCT/JP2023/022724
§ 371 (c)(1),
(2) Date: Aug. 6, 2024

(87) PCT Pub. No.: WO2024/004754
PCT Pub. Date: Jan. 4, 2024

(65) Prior Publication Data

US 2025/0201484 A1 Jun. 19, 2025

(30) Foreign Application Priority Data

Jun. 29, 2022 (JP) ................................ 2022-104291

(51) Int. Cl.
*H01G 4/38* (2006.01)
*H01G 4/224* (2006.01)

(52) U.S. Cl.
CPC .............. *H01G 4/38* (2013.01); *H01G 4/224* (2013.01)

(58) Field of Classification Search
None
See application file for complete search history.

(56) References Cited

U.S. PATENT DOCUMENTS

2018/0211782 A1* 7/2018 Kadomura ............ H01G 4/224
2019/0080850 A1* 3/2019 Inazumi .................. H01G 2/04
2022/0013298 A1* 1/2022 Urano ...................... H01G 4/32
(Continued)

FOREIGN PATENT DOCUMENTS

CN 112514015 A 3/2021
CN 115039188 A * 9/2022 .............. H01G 4/32
(Continued)

OTHER PUBLICATIONS

KR '255 Translation (Year: 2013).*
(Continued)

*Primary Examiner* — Dion R. Ferguson
(74) *Attorney, Agent, or Firm* — United IP Counselors, LLC

(57) ABSTRACT

A capacitor includes multiple capacitor elements including a first end surface electrode and a second end surface electrode; a first conductor in contact with and electrically connected to the first end surface electrode; a second conductor in contact with and electrically connected to the second end surface electrode; a third conductor adjacent to the first conductor, the third conductor including an embedded part positioned in a first section that overlaps with the first conductor and an exposed part positioned in a second section separate from the first section; and a sealing resin part sealing the third conductor to embed the embedded part and expose the exposed part.

3 Claims, 15 Drawing Sheets

(56) References Cited

U.S. PATENT DOCUMENTS

| | | | | |
|---|---|---|---|---|
| 2022/0102073 | A1 * | 3/2022 | Hisamura | H01G 2/08 |
| 2023/0038001 | A1 * | 2/2023 | Takahashi | H01G 2/02 |
| 2025/0201484 | A1 * | 6/2025 | Yamakawa | H01G 4/38 |

FOREIGN PATENT DOCUMENTS

| | | | | | |
|---|---|---|---|---|---|
| JP | 2009099884 | A | * | 5/2009 | H01G 4/228 |
| JP | 2012-199350 | A | | 10/2012 | |
| JP | 2014143227 | A | * | 8/2014 | H01G 4/18 |
| JP | 6124441 | B2 | * | 5/2017 | H01G 2/10 |
| JP | 2020-031117 | A | | 2/2020 | |
| JP | 2023162418 | A | * | 11/2023 | |
| KR | 101098297 | B1 | * | 12/2011 | H01G 4/385 |
| KR | 101273255 | B1 | * | 6/2013 | H01G 4/385 |
| WO | WO-2020162138 | A1 | * | 8/2020 | H01G 4/002 |
| WO | 2020/241145 | A1 | | 12/2020 | |
| WO | WO-2021014927 | A1 | * | 1/2021 | H01G 2/10 |
| WO | WO-2021220918 | A1 | * | 11/2021 | H01G 4/32 |
| WO | WO-2022163278 | A1 | * | 8/2022 | H01G 4/32 |

OTHER PUBLICATIONS

International Search Report for International Application No. PCT/JP2023/022724 dated Sep. 12, 2023, Japan, 2 pages.

Extended European Search Report of corresponding European Patent Application No. 23831200.3 dated Apr. 23, 2026, 10 pages.

* cited by examiner

Prior Art

CAPACITOR

CROSS-REFERENCE TO RELATED APPLICATIONS

This application is a National Stage Entry application of PCT International Application No. PCT/JP2023/022724, filed on Jun. 20, 2023, which claims the priority benefit of Japanese Patent Application No. 2022-104291, filed on Jun. 29, 2022, the entire contents of both of which are hereby incorporated by reference.

BACKGROUND

1. Technical Field

The present invention relates to a capacitor with a heat dissipating structure.

2. Description of the Background

In recent years, from the viewpoint of environmental protection, various electric devices are controlled by inverter circuits to save energy and improve efficiency. In particular, the automotive industry has been actively developing energy-saving and efficiency-pursuing techniques, introducing hybrid electric vehicles (hereinafter referred to as "HEVs") that run on electric motors and gasoline engines and electric vehicles (hereinafter referred to as "EVs") to the market.

Electric motors for HEVs and EVs operate at a high voltage range of several hundred volts. As capacitor elements for use in such electric motors, metallized film capacitor elements have been gaining attention for their high-voltage withstanding capability with low loss. The market's demand for maintenance-free devices also contributes to the noticeable trend of opting for metallized film capacitor elements with long life spans. In the following, the "metallized film capacitor elements" may also be referred to simply as the "capacitor elements."

There is a capacitor obtained by resin-molding metallized film capacitor elements (capacitor elements) placed in a case with resin. For example, as shown in FIGS. 15A and 15B, a capacitor 1' includes a plurality of (e.g., 6) capacitor elements 100, a case 400, a first bus bar 200, a second bus bar 300, and a filling resin 500 (e.g., see WO 2020/241145 A). The first bus bar 200 has an electrode terminal part 210 connected to end surface electrodes formed at first end surfaces of the capacitor elements 100. The second bus bar 300 has an electrode terminal part connected to end surface electrodes formed at second end surfaces of the capacitor elements 100. The case 400, housing the capacitor elements 100 and others, is filled with the filling resin 500.

In the capacitor 1' shown in FIGS. 15A and 15B, the electrode terminal part 210 of the first bus bar 200 has a front plate part 211, a rear plate part 212, and a projecting part 213. The front plate part 211 has a narrow quadrangular shape and is connected to the first end surface electrodes of the capacitor elements 100 at the front. The rear plate part 212 has a rectangular shape and is connected to the first end surface electrodes of the capacitor elements 100 at the rear. The projecting part 213 projects in a square wave manner between the front plate part 211 and the rear plate part 212. The front plate part 211 and the rear plate part 212 are embedded in the filling resin 500. The projecting part 213 is exposed outside the filling resin 500.

When the capacitor 1' is energized, current flows through the capacitor elements 100, the first bus bar 200, and the second bus bar 300. The heat generated by the energizing is easily externally dissipated by the projecting part 213 exposed outside the filling resin 500.

BRIEF SUMMARY

In the example shown in FIGS. 15A and 15B, the electrode terminal part 210 of the first bus bar 200 is first connected to part of the capacitor elements 100 inside the filling resin 500. Then, the electrode terminal part 210 extends outside the filling resin 500 to be dissipated by the projecting part 213. Then, the electrode terminal part 210 again enters inside the filling resin 500 to be connected to the other part of the capacitor elements 100. This elongates the current path and hence increases ESL (Equivalent Series Inductance). Additionally, due to the projecting part 213 of the first bus bar 200 detouring by projecting outside the filling resin 500, the current path largely varies among the capacitor elements 100. This can disrupt the current balance, resulting in abnormal heat generation.

An object of the present invention is to provide a capacitor prevented from abnormal heat generation and capable of realizing low ESL.

A first aspect of the present invention provides a capacitor including:

- a plurality of capacitor elements each including
  - a first end surface electrode positioned on a first end surface and corresponding to a first polarity, and
  - a second end surface electrode positioned on a second end surface and corresponding to a second polarity;
- a first conductor in contact with and electrically connected to the first end surface electrode;
- a second conductor in contact with and electrically connected to the second end surface electrode;
- a third conductor adjacent to the first conductor, the third conductor including
  - an embedded part positioned in a first section that overlaps with the first conductor in a plan view seen from the first end surface electrode toward the second end surface electrode, and
  - an exposed part positioned in a second section separate from the first section; and
- a sealing resin part sealing the plurality of capacitor elements, the first conductor, and the second conductor, the sealing resin part sealing the third conductor to embed the embedded part and expose the exposed part.

The present invention provides a capacitor prevented from abnormal heat generation and capable of realizing low ESL.

DETAILED DESCRIPTION

First Embodiment

In the following, with reference to FIGS. 1 to 7, a detailed description will be given of a first embodiment.

The structure of a capacitor 1 will be described with reference to FIGS. 1 to 7. Throughout FIGS. 1 to 7, x-, y-, and x-axes represent identical directions. In the integrated capacitor 1, the plane along the opening of a case 60 is the xy-plane, the plane along the short side of the case 60 is the yz-plane, and the plane along the long side of the case 60 is the zx-plane.

Figure 1:
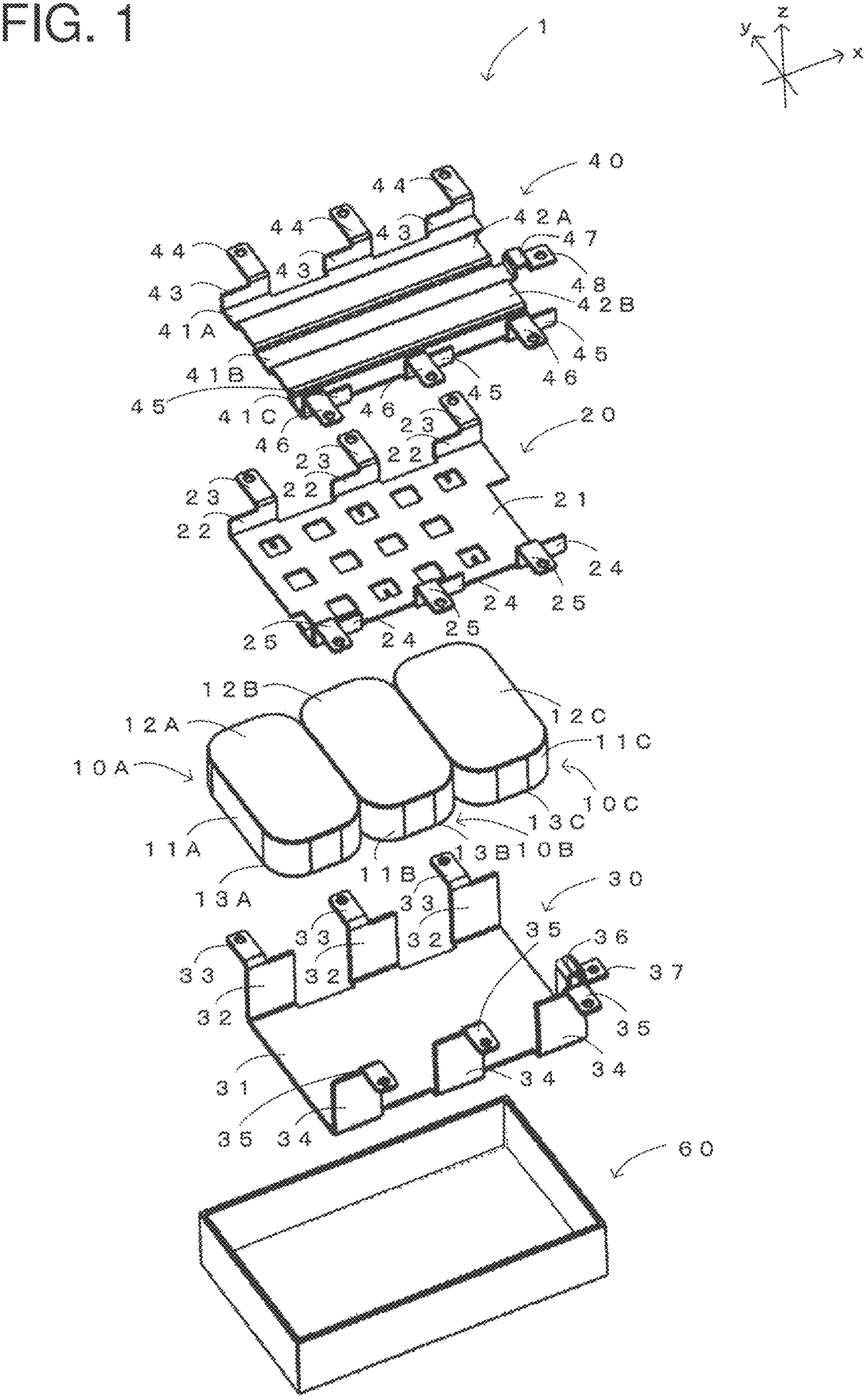
FIG. 1 is an exploded perspective view of a capacitor according to a first embodiment.
Figure 2:
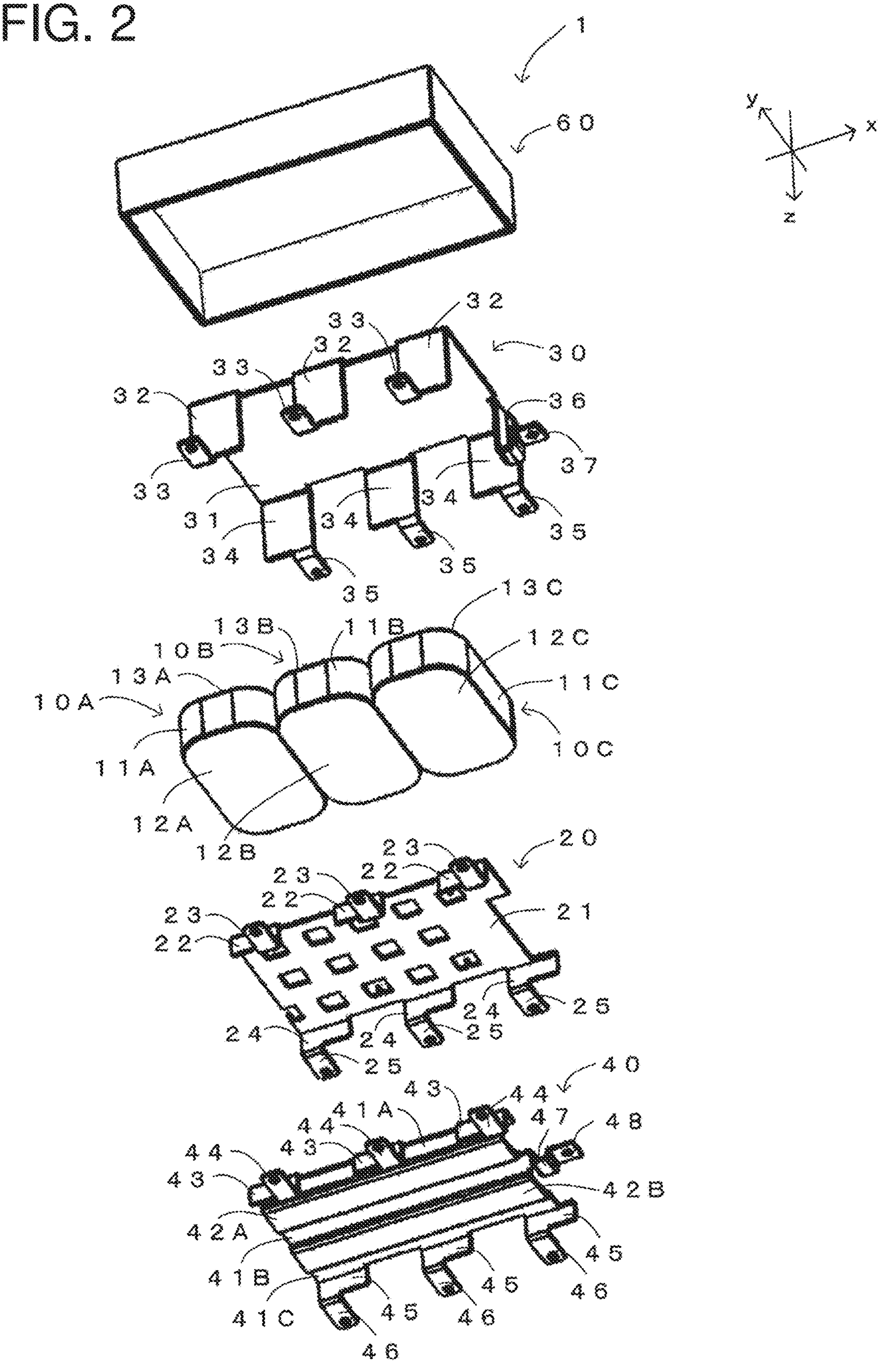
FIG. 2 is an exploded perspective view of the capacitor seen from a direction different from FIG. 1.
Figure 7:
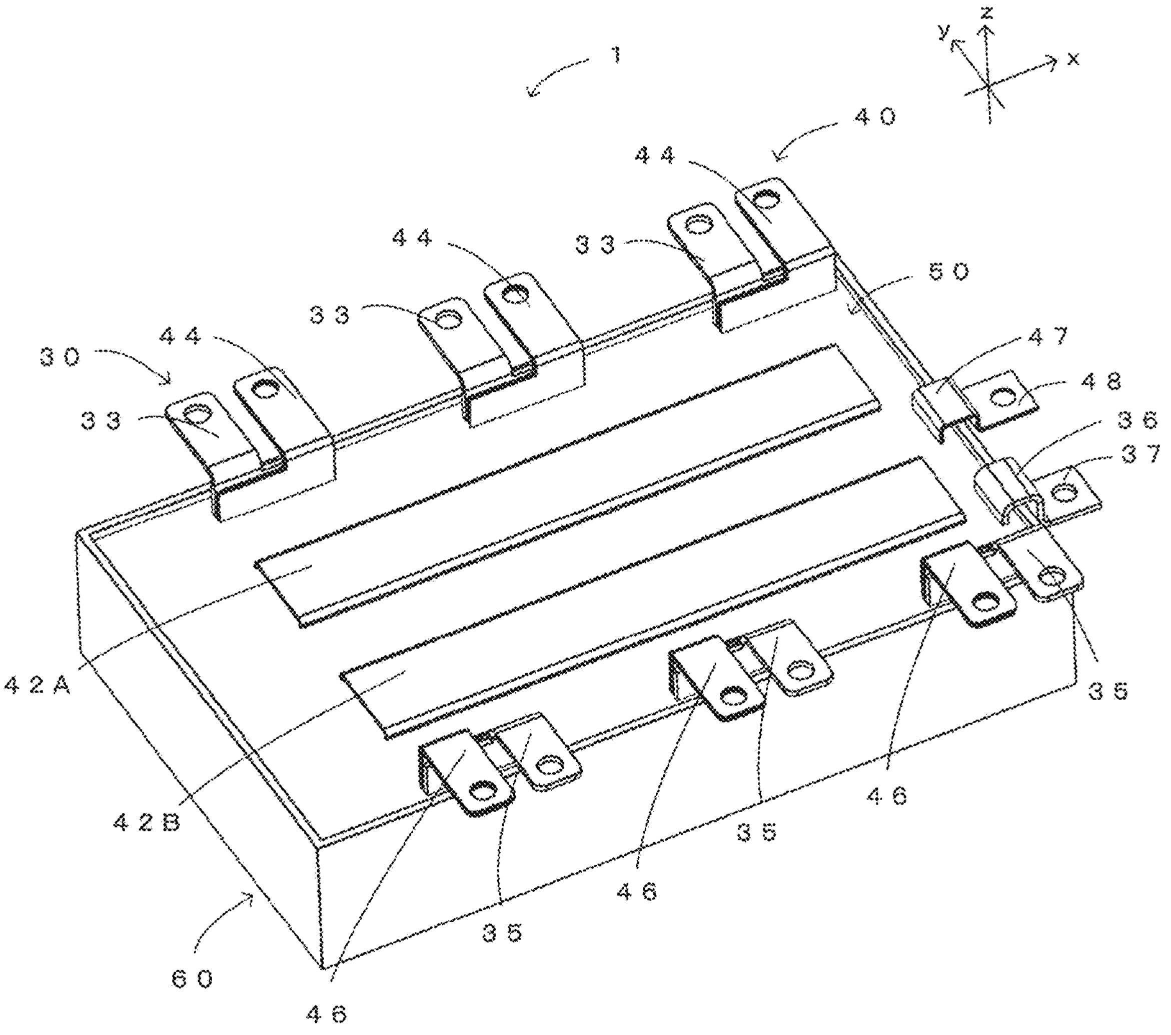
FIG. 7 is a perspective view of the capacitor elements, the first bus bar, the second bus bar, the third bus bar, the case, and a filling resin part of the capacitor according to the first embodiment.

As shown in FIGS. 1, 2, and 7, the capacitor 1 includes a plurality of (3 in the present embodiment) metallized film capacitor elements (capacitor elements) 10A, 10B, 10C, a first bus bar (first conductor) 20, a second bus bar (second conductor) 30, a third bus bar (third conductor) 40, a filling resin part (sealing resin part) 50, and a case 60. As shown in FIGS. 1 and 2, the capacitor elements 10A, 10B, 10C includes element body parts 11A, 11B, 11C, first end surface electrodes 12A, 12B, 12C, and second end surface electrodes 13A, 13B, 13C. The first end surface electrodes 12A, 12B, 12C are formed at the first end surfaces of the element body parts 11A, 11B, 11C by spraying a metal such as zinc. The second end surface electrodes 13A, 13B, 13C are formed at the second end surfaces of the element body parts 11A, 11B, 11C by spraying a metal such as zinc.

The element body parts 11A to 11C are formed by overlaying two metallized films in which aluminum is deposited on a dielectric film, rolling or laminating the overlaid metallized films, and pressing them into a flat shape. While the element body parts 11A to 11C according to the present embodiment are formed of metallized films in which aluminum is deposited on dielectric films, the present invention is not limited thereto. The element body parts 11A to 11C may be formed of metallized films in which another metal such as zinc or magnesium is deposited on a dielectric film. They may be formed of metallized films in which a plurality of such metals are deposited. Furthermore, they may be formed of metallized films in which alloy of such metals is deposited.

Three capacitor elements 10A to 10C are arranged in a matrix of front, rear, right, and left, having their circumferential surfaces opposed to that of adjacent one. In the present embodiment, three capacitor elements are arranged in the x-axis direction and one in the y-axis direction. In this state, by the first bus bar 20 being in contact with the first end surface electrodes 12A to 12C, an electrical connection is established. By the second bus bar 30 being in contact with the second end surface electrodes 13A to 13C, an electrical connection is established. The first bus bar 20 and the second bus bar 30 are made of a conductive material such as copper.

In the present embodiment, the first end surface electrodes 12A to 12C and the first bus bar 20 are the P-pole side. The second end surface electrodes 13A to 13C and the second bus bar 30 are the N-pole side.

The first bus bar 20 is made of a conductive material such as copper. In the following, the shape of the first bus bar 20 is described.

Figure 4:
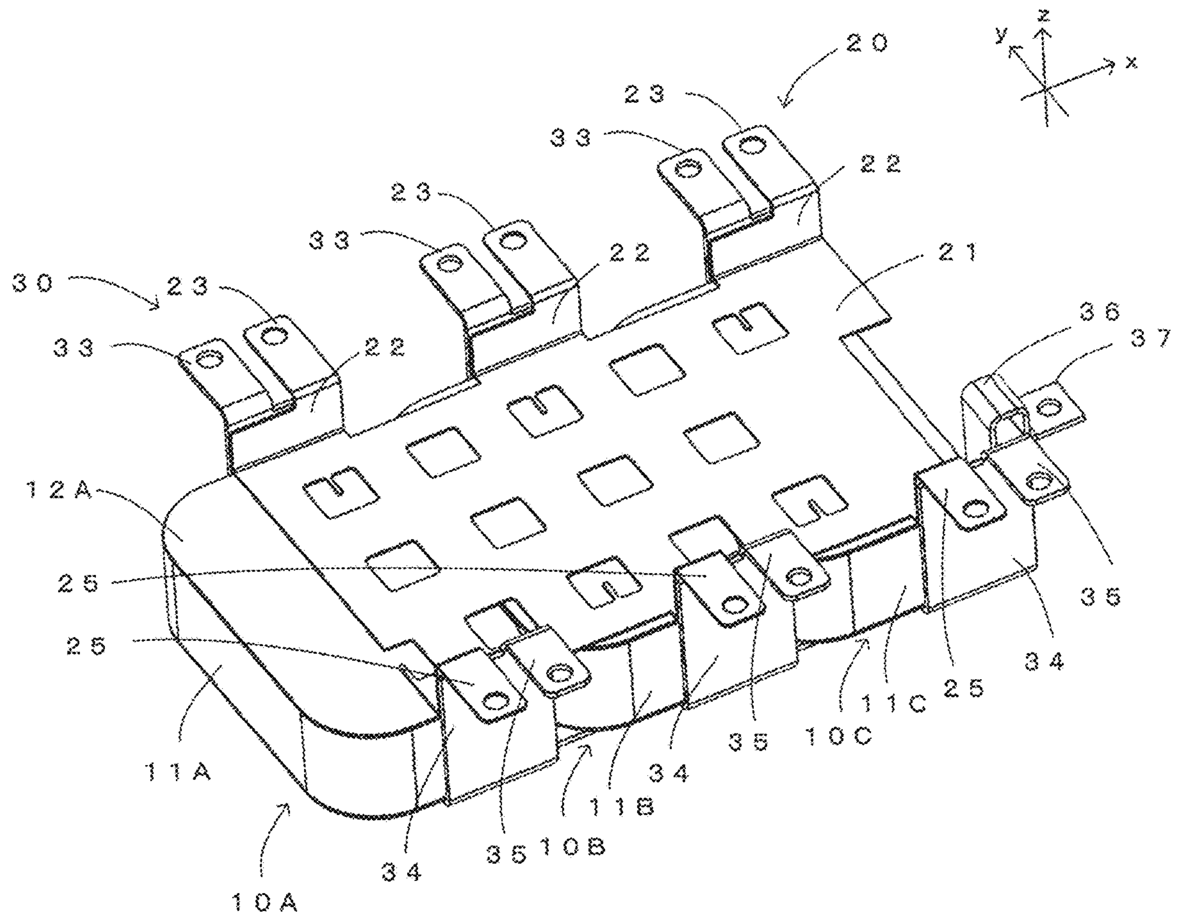
FIG. 4 is a perspective view of the capacitor elements, a first bus bar, and the second bus bar of the capacitor according to the first embodiment.

As shown in FIGS. 1, 2, and 4, the first bus bar 20 has a flat plate-like end surface electrode contact part 21. In the integrated capacitor 1, the end surface electrode contact part 21 is in contact with the first end surface electrodes 12A to 12C to establish an electrical connection. The end surface electrode contact part 21 according to the present embodiment has a plurality of projecting parts. The projecting parts are formed by removing parts from the end surface electrode contact part 21 in a recessed manner. By soldering the plurality of projecting parts of the end surface electrode contact part 21 and the first end surface electrodes 12A to 12C to each other, the first bus bar 20 and the first end surface electrodes 12A to 12C are electrically connected to each other.

The first bus bar 20 has flat plate-like rising parts 22. The rising parts 22 are at three locations in the y-axis positive-direction edge of the end surface electrode contact part 21. The rising parts 22 extend in the z-axis positive direction.

The first bus bar 20 has external connection terminal parts (first fastening part) 23. The external connection terminal parts 23 extend in the y-axis positive direction from one end of the rising parts 22 opposite to the end surface electrode contact part 21.

The first bus bar 20 has flat plate-like rising parts 24. The rising parts 24 are at three locations in the y-axis negative-direction edge of the end surface electrode contact part 21. The rising parts 24 extend in the z-axis positive direction.

The first bus bar 20 has external connection terminal parts (first fastening part) 25. The external connection terminal parts 25 extend in the y-axis negative direction from one end of the rising parts 24 opposite to the end surface electrode contact part 21.

The second bus bar 30 is made of a conductive material such as copper. In the following, the shape of the second bus bar 30 is described.

Figure 3:
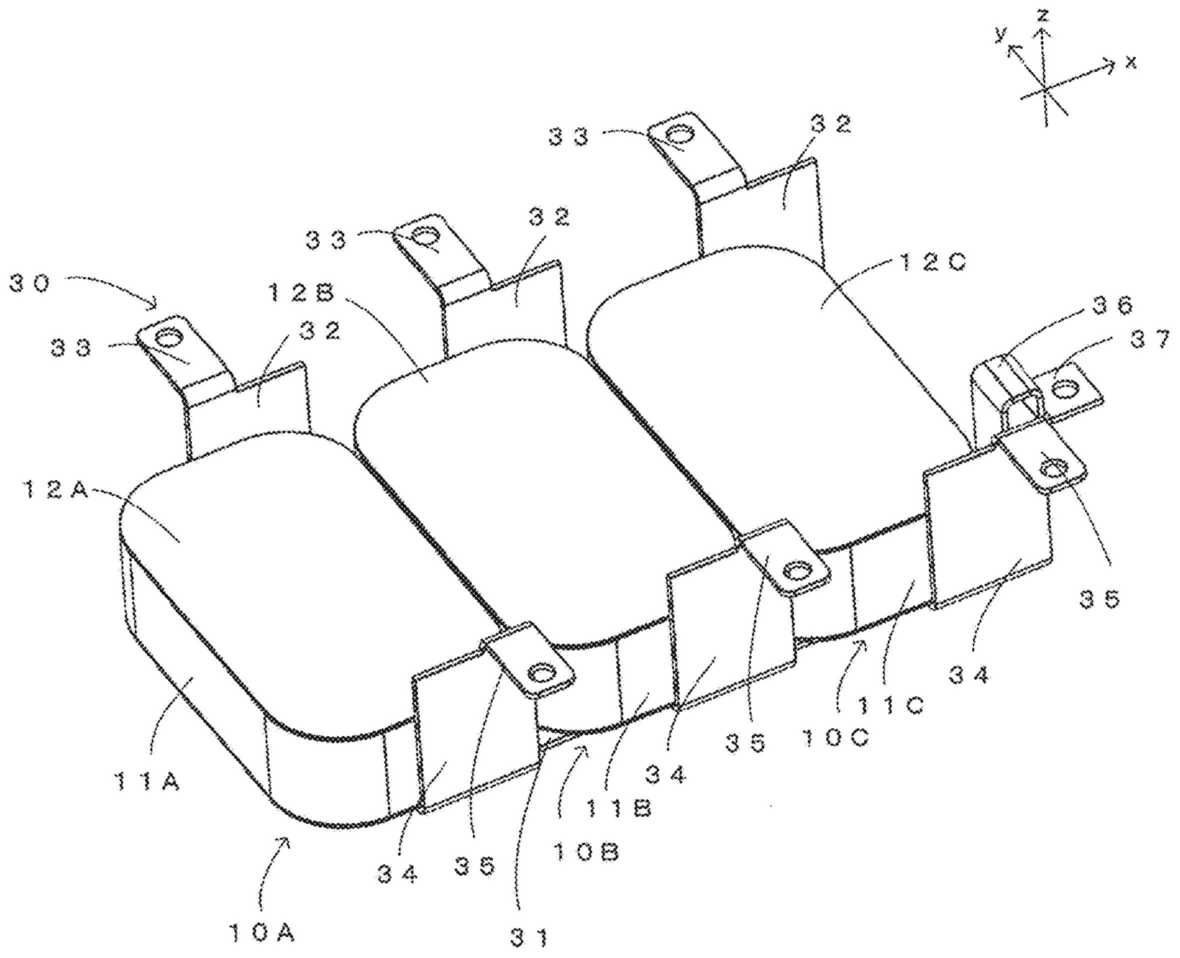
FIG. 3 is a perspective view of capacitor elements and a second bus bar of the capacitor according to the first embodiment.

As shown in FIGS. 1 to 3, the second bus bar 30 has a flat plate-like end surface electrode contact part 31. In the integrated capacitor 1, the end surface electrode contact part

31 is in contact with the second end surface electrodes 13A to 13C to establish an electrical connection.

While not shown in FIGS. 1 and 2, the end surface electrode contact part 31 has a plurality of parts removed in a recessed manner. The end surface electrode contact part 31 has a plurality of projecting parts. The projecting parts are formed by removing parts from the end surface electrode contact part 31 in a recessed manner. By soldering the plurality of projecting parts of the end surface electrode contact part 31 and the second end surface electrodes 13A to 13C to each other, the second bus bar 30 and the second end surface electrodes 13A to 13C are electrically connected to each other.

The second bus bar 30 has flat plate-like rising parts 32. The rising parts 32 are at three positions in the y-axis positive-direction edge of the end surface electrode contact part 31. The rising parts 32 extend in the z-axis positive direction.

In the integrated capacitor 1, the rising parts 22 and the rising parts 32 partially overlap with each other in a plan view as seen from the y-axis negative side toward the y-axis positive side (hereinafter referred to as the "zx-plan view"). Furthermore, in a plan view as seen from the z-axis positive side toward the z-axis negative side (hereinafter referred to as the "xy-plan view"), the rising parts 22 are disposed on the y-axis negative side than the rising parts 32 while insulated. Specifically, an insulator (not shown) such as an insulating plate or insulating paper is inserted between the first bus bar 20 and the second bus bar 30. Alternatively, a predetermined clearance is provided between the first bus bar 20 and the second bus bar 30 to ensure an insulating distance. The same applies to other insulating locations below.

The second bus bar 30 has external connection terminal parts 33. The external connection terminal parts 33 extend in the y-axis positive direction from one end of the rising parts 32 opposite to the end surface electrode contact part 31.

The second bus bar 30 has flat plate-like rising parts 34. The rising parts 34 are at three locations in the y-axis negative-direction edge of the end surface electrode contact part 31. The rising parts 34 extend in the z-axis positive direction.

In the integrated capacitor 1, the rising parts 24 and the rising parts 34 partially overlap with each other in a zx-plan view. Furthermore, in an xy-plan view, the rising parts 24 are disposed on the y-axis positive side than the rising parts 34 while insulated.

The second bus bar 30 has external connection terminal parts 35. The external connection terminal parts 35 extend in the y-axis negative direction from one end of the rising parts 34 opposite to the end surface electrode contact part 31.

The second bus bar 30 has a bent plate-like rising part 36. The rising part 36 is at one location in the y-axis negative direction in the x-axis positive-direction edge of the end surface electrode contact part 31. The rising part 36 extends in the z-axis positive direction, then in the x-axis positive direction, and finally in the z-axis negative direction.

The second bus bar 30 has an external connection terminal part 37. The external connection terminal part 37 extends in the x-axis positive direction from one side opposite to the end surface electrode contact part 31.

In the integrated capacitor 1, the capacitor elements 10A to 10C are disposed between the y-axis negative-side surfaces of the rising parts 32 and the y-axis positive-side surfaces of the rising parts 34. Here, the z-axis positive-side surface of the end surface electrode contact part 31 is in contact with the z-axis negative-side surfaces of the second end surface electrodes 13A to 13C.

In the integrated capacitor 1, the first bus bar 20 is disposed between the y-axis negative-side surfaces of the rising parts 32 and the y-axis positive-side surfaces of the rising parts 34, with the first bus bar 20 and the second bus bar 30 being insulated from each other. In the integrated capacitor 1, the second bus bar 30 is insulated from the third bus bar 40.

In the integrated capacitor 1, the third bus bar 40 is in contact with nowhere in the three capacitor elements 10A to 10C but is in contact with the first bus bar 20. The third bus bar 40 is formed of a conductive material such as copper.

Figure 5:
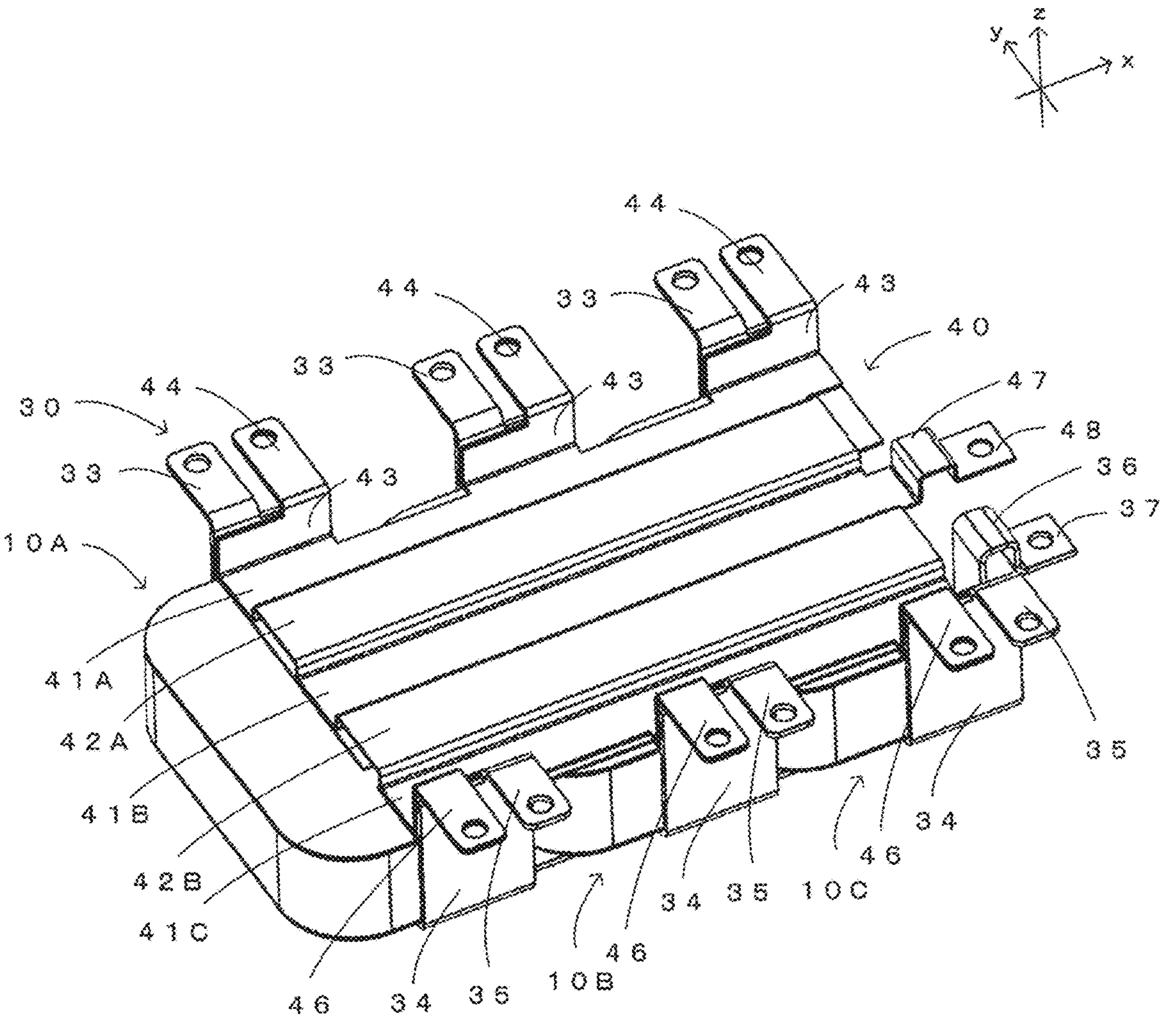
FIG. 5 is a perspective view of the capacitor elements, the first bus bar, the second bus bar, and the third bus bar of the capacitor according to the first embodiment.

As shown in FIGS. 1, 2, and 5, the third bus bar 40 has an embedded part 41A. In the integrated capacitor 1, the embedded part 41A is not in contact with any of the first end surface electrodes 12A to 12C but is in contact with the z-axis positive-side surface of the end surface electrode contact part 21. The embedded part 41A is quadrangular in an xy-plan view. Note that, in the integrated capacitor 1, the embedded part 41A according to the present embodiment is in contact with nowhere in the three capacitor elements 10A to 10C.

As shown in FIGS. 1, 2, and 5, the third bus bar 40 has an embedded part 41B. In the integrated capacitor 1, the embedded part 41B is not in contact with any of the first end surface electrodes 12A to 12C but is in contact with the z-axis positive-side surface of the end surface electrode contact part 21. The embedded part 41B is quadrangular in an xy-plan view. Note that, in the integrated capacitor 1, the embedded part 41B according to the present embodiment is in contact with nowhere in the three capacitor elements 10A to 10C.

As shown in FIGS. 1, 2, and 5, the third bus bar 40 has an embedded part 41C. In the integrated capacitor 1, the embedded part 41C is not in contact with any of the first end surface electrodes 12A to 12C but is in contact with the z-axis positive-side surface of the end surface electrode contact part 21. The embedded part 41C is quadrangular in an xy-plan view. Note that, in the integrated capacitor 1, the embedded part 41C according to the present embodiment is in contact with nowhere in the three capacitor elements 10A to 10C.

As shown in FIGS. 1, 2, and 5, the third bus bar 40 has a projecting part 42A. In the integrated capacitor 1, the projecting part 42A is not in contact with any of the first end surface electrodes 12A to 12C. Furthermore, the projecting part 42A is in contact with nowhere in the first bus bar 20 such as the z-axis positive-side surface of the end surface electrode contact part 21. The projecting part 42A is quadrangular in an xy-plan view. The projecting part 42A is positioned between the embedded part 41A and the embedded part 41B as seen in an xy-plan view. The z-axis positive-side surface of the projecting part 42A is flat. That is, the z-axis positive-side surface of the projecting part 42A is parallel to an xy-plane.

Note that, in the integrated capacitor 1, the projecting part 42A according to the present embodiment is in contact with nowhere in the three capacitor elements 10A to 10C. The portion of the projecting part 42A that is opposed to the end surface electrode contact part 21 is an exposed part.

As shown in FIGS. 1, 2, and 5, the third bus bar 40 has a projecting part 42B. In the integrated capacitor 1, the projecting part 42B is not in contact with any of the first end surface electrodes 12A to 12C. Furthermore, the projecting part 42B is in contact with nowhere in the first bus bar 20 such as the z-axis positive-side surface of the end surface electrode contact part 21. The projecting part 42B is quadrangular in an xy-plan view. The projecting part 42B is positioned between the embedded part 41B and the embedded part 41C in an xy-plan view. The z-axis positive-side surface of the projecting part 42B is flat. That is, the z-axis positive-side surface of the projecting part 42B is parallel to an xy-plane.

Note that, in the integrated capacitor 1, the projecting part 42B according to the present embodiment is in contact with nowhere in the three capacitor elements 10A to 10C. The portion of the projecting part 42B that is opposed to the end surface electrode contact part 21 is an exposed part.

The embedded part 41A, the projecting part 42A, the embedded part 41B, the projecting part 42B, and the embedded part 41C are sequentially positioned in the y-axis negative direction in an xy-plan view.

Figure 6:
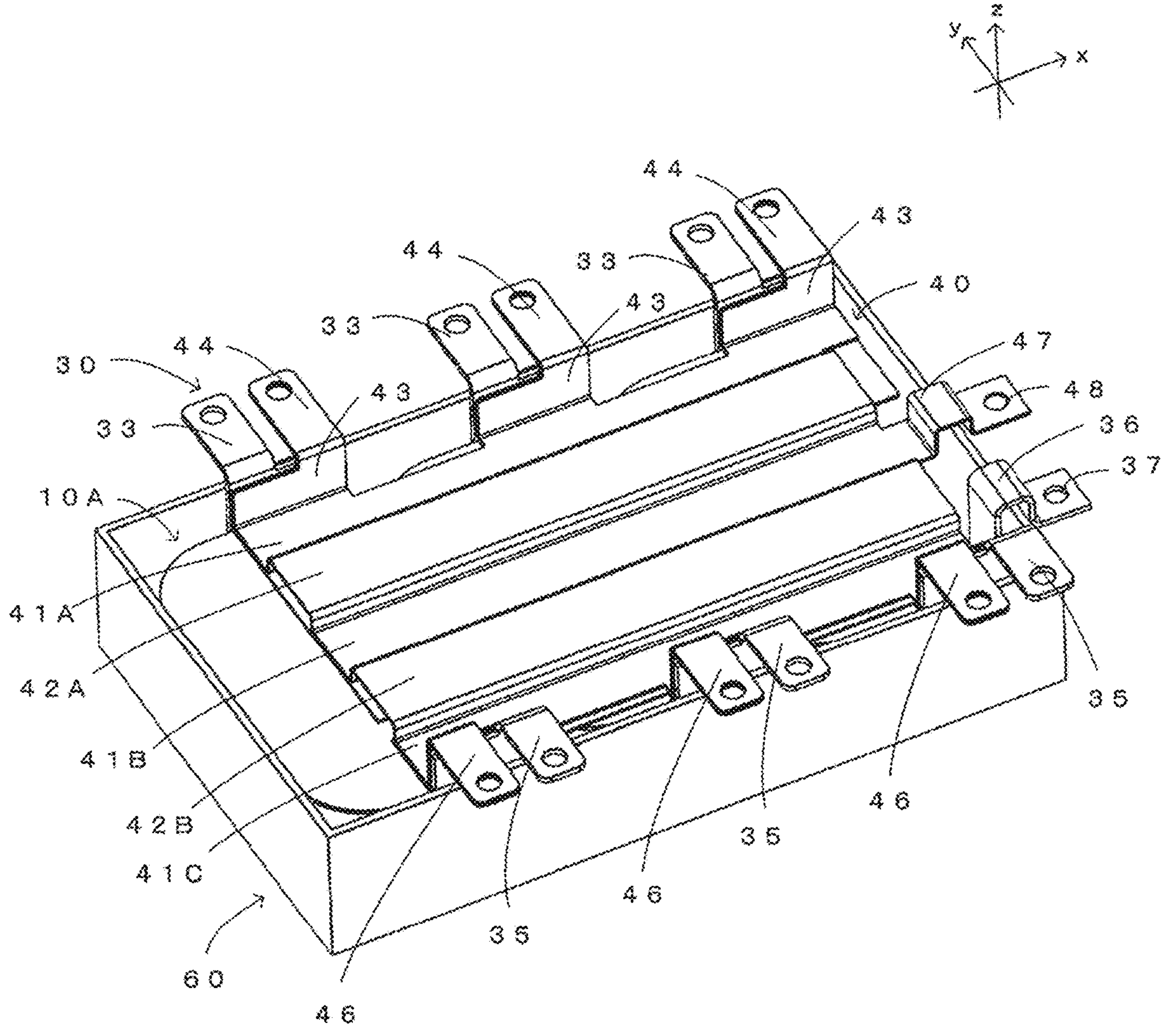
FIG. 6 is a perspective view of the capacitor elements, the first bus bar, the second bus bar, the third bus bar, and a case of the capacitor according to the first embodiment.

As shown in FIGS. 6 and 7, in the integrated capacitor 1, the embedded parts 41A to 41C are embedded in the filling resin part 50. The portions of the projecting parts 42A, 42B that are opposed to the end surface electrode contact part 21 is exposed outside the filling resin part 50.

The third bus bar 40 has flat plate-like rising parts 43. The rising parts 43 are at three locations in the y-axis positive-direction edge of the embedded part 41A. The rising parts 43 extend in the z-axis positive direction. In the integrated capacitor 1, the rising parts 22 and the rising parts 43 partially overlap with each other in a zx-plan view.

The third bus bar 40 has external connection terminal parts (second fastening part) 44. The external connection terminal parts 44 extend in the y-axis positive direction from one end of the rising parts 43 opposite to the end surface electrode contact part 21. In the integrated capacitor 1, the external connection terminal parts 23 and the external connection terminal parts 44 partially overlap with each other in an xy-plan view.

The third bus bar 40 has flat plate-like rising parts 45. The rising parts 45 are at three locations in the y-axis negative-direction edge of the embedded part 41C. The rising parts 45 extend in the z-axis positive direction. In the integrated capacitor 1, the rising parts 24 and the rising parts 45 partially overlap with each other in a zx-plan view.

The third bus bar 40 has external connection terminal parts (second fastening part) 46. The external connection terminal parts 46 extend in the y-axis negative direction from one end of the rising parts 45 opposite to the end surface electrode contact part 21. In the integrated capacitor 1, the external connection terminal parts 25 and the external connection terminal parts 46 partially overlap with each other in an xy-plan view.

The third bus bar 40 has a bent plate-like rising part 47. The rising part 47 is at one location in the x-axis positive-direction edge of the embedded part 41B. The rising part 47 extends in the z-axis positive direction, then in the x-axis positive direction, and finally in the z-axis negative direction.

The third bus bar 40 has an external connection terminal part 48. The external connection terminal part 48 extends in the x-axis positive direction from one side opposite to the embedded part 41B.

In the integrated capacitor 1, the third bus bar 40 has the rising parts 43 disposed on the y-axis negative side than the y-axis negative-side surfaces of the rising parts 22. The third bus bar 40 has the rising parts 45 disposed on the y-axis positive side than the y-axis positive-side surfaces of the rising parts 24. Here, the z-axis negative-side surfaces of the embedded parts 41A to 41C are in contact with the z-axis positive-side surface of the end surface electrode contact part 21. The z-axis negative-side surfaces of the external connection terminal parts 44 are in contact with the z-axis positive-side surfaces of the external connection terminal parts 23. The z-axis negative-side surfaces of the external connection terminal parts 46 are in contact with the z-axis positive-side surfaces of the external connection terminal parts 25.

The external connection terminal parts 23 and the external connection terminal parts 44 overlap with each other in an xy-plan view. The external connection terminal parts 25 and the external connection terminal parts 46 overlap with each other in an xy-plan view. In this manner, the third bus bar 40 is mounted on the first bus bar 20 having the external connection terminal parts 23 and the external connection terminal parts 44 fastened to each other, and the external connection terminal parts 25 and the external connection terminal parts 46 fastened to each other. This improves the positioning accuracy of the z-axis positive-side surfaces of the projecting parts 42A, 42B in the integrated capacitor 1. That is, this improves the positioning accuracy of the z-axis positive-side surfaces of the portions of the projecting parts 42A, 42B exposed outside the filling resin part 50.

The external connection terminal parts 23, 25 and the external connection terminal parts 33, 35 are AC terminals. The external connection terminal part 47 and the external connection terminal part 37 are DC terminals.

The case 60 is made of any of various materials such as, for example, resins such as polyphenylene sulfide (PPS) or polybutylene terephthalate (PBT), organic materials such as plastics, and inorganic materials such as ceramics.

The case 60 has a rectangular box-shape with one side (a z-axis positive side) open.

As shown in FIG. 6, the capacitor elements 10A to 10C, the first bus bar 20, the second bus bar 30, and the third bus bar 40 are integrated to be housed in the case 60. As shown in FIG. 7, the capacitor elements 10A to 10C, the first bus bar 20, the second bus bar 30, and the third bus bar 40 are integrated and housed in the case 60, and then sealed with resin.

The filling resin part 50 eliminates any space between the case 60 and the integrated capacitor elements 10A to 10C, first bus bar 20, second bus bar 30, and third bus bar 40. The filling resin part 50 may be, for example, epoxy resin.

The filling resin part 50 is not specified to epoxy resin but may be any of various insulating materials used as sealing resin for electronic components. The filling resin part 50 fills up the case 60 in a liquid state and then is cured.

As shown in FIGS. 6 and 7, the embedded parts 41A to 41C are embedded in the filling resin part 50. The portions of the projecting parts 42A, 42B opposed to the end surface electrode contact part 21 are exposed outside the filling resin part 50. For example, when the capacitor 1 is mounted on an external device, the cooling component of the external device abuts the flat surfaces of the projecting parts 42A, 42B. The heat from the energized capacitor 1 is transferred from the embedded parts 41A to 41C to the projecting parts 42A, 42B, then to the cooling component abutting the projecting parts 42A, 42B.

In the following, the manufacturing process of the capacitor 1 is described. The following manufacturing process of the capacitor 1 is merely an example, and any assembly order may be employed so long as the capacitor 1 is ultimately brought into the state shown in FIG. 7.

First, the capacitor elements 10A to 10C are disposed from the z-axis positive side between the y-axis negative-side surfaces of the rising parts 32 and the y-axis positive-side surfaces of the rising parts 34. Here, the z-axis negative-side surfaces of the second end surface electrodes 13A to 13C are in contact with the z-axis positive-side surface of the end surface electrode contact part 31 to enter the state shown in FIG. 3. Then, the second end surface electrodes 13A to 13C and the end surface electrode contact part 31 are electrically connected to each other by soldering, for example.

Next, the first bus bar 20 is disposed from the z-axis positive side between the y-axis negative-side surfaces of the rising parts 32 and the y-axis positive-side surfaces of the rising parts 34. Here, the z-axis negative-side surface of the end surface electrode contact part 21 is in contact with the z-axis positive-side surfaces of the first end surface electrodes 12A, 12B, 12C but not with the second bus bar 30. This achieves the state shown in FIG. 4. Then, the first end surface electrodes 12A to 12C and the end surface electrode contact part 21 are electrically connected to each other by soldering, for example.

Next, the third bus bar 40 is disposed from the z-axis positive side so that the rising parts 43 are positioned on the y-axis negative side than the y-axis negative-side surfaces of the rising parts 22, and the rising parts 45 are positioned on the y-axis positive side than the y-axis positive-side surfaces of the rising parts 24. Here, the z-axis negative-side surfaces of the embedded parts 41A to 41C are in contact with the z-axis positive-side surface of the end surface electrode contact part 21. The z-axis negative-side surfaces of the external connection terminal parts 44 are in contact with the y-axis positive-side surfaces of the external connection terminal parts 23. The z-axis negative-side surfaces of the external connection terminal parts 46 are in contact with the y-axis positive-side surfaces of the external connection terminal parts 25. This achieves the state shown in FIG. 5. In this state, the external connection terminal parts 23 and the external connection terminal parts 44 are fastened to each other, and the external connection terminal parts 25 and the external connection terminal parts 46 are fastened to each other.

The integrated capacitor elements 10A to 10C, second bus bar 30, first bus bar 20, and third bus bar 40 are disposed in the case 60 from the z-axis positive side. Here, the z-axis negative-side surface of the end surface electrode contact part 31 is opposed to the bottom surface of the case 60 with a predetermined clearance. This achieves the state shown in FIG. 6.

In the state shown in FIG. 6, liquid epoxy resin is poured into the case 60 from its opening and is cured at a predetermined curing temperature. This completes the capacitor 1 shown in FIG. 7.

The capacitor 1 according to the first embodiment includes, separately from the first bus bar 20 in contact with and electrically connected to the first end surface electrodes 12A to 12C, the third bus bar 40 that is not in contact with the first end surface electrodes 12A to 12C but in contact with the end surface electrode contact part 21 of the first bus bar 20. The third bus bar 40 has the embedded parts 41A to 41C and the projecting parts 42A, 42B. In an xy-plan view, the embedded parts 41A to 41C are in a first section that overlaps with the first bus bar 20. The embedded parts 41A to 41C are in contact with the first bus bar 20 and are embedded in the filling resin part 50. In an xy-plan view, the projecting parts 42A, 42B are in a second section that overlaps with the first bus bar 20 and is separate from the first section. The projecting parts 42A, 42B have exposed parts that are not in contact with the first bus bar 20 and are exposed outside the filling resin part 50. The exposed parts that constitute the projecting parts 42A, 42B of the third bus bar 40 function as the heat dissipating structure that dissipates heat due to the energized capacitor 1 to the outside of the capacitor 1. This prevents the capacitor 1 from overheating.

The first bus bar 20 serving as the current path avoids lengthy current path and thus realizes low ESL. This structure also suppresses current path variations among the capacitor elements 10A, 10B, 10C, avoiding disrupted current balance. This prevents abnormal heat generation.

By fastening the external connection terminal parts 23, 25 (first fastening part) of the first bus bar 20 and the external connection terminal parts 44, 46 (second fastening part) of the third bus bar 40 to each other, the positioning accuracy of the exposed parts constituting the projecting parts 42A, 42B improves. As a result, for example, when the capacitor 1 is mounted on an external device, the cooling component prepared in the external device can be disposed to be in contact with the flat surfaces of the exposed parts constituting the projecting parts 42A, 42B.

Second Embodiment

In the following, with reference to FIGS. 8 to 14, a detailed description will be given of a second embodiment. The structures identical to those of the first embodiment are demoted by the same reference characters, and their description will not be repeated.

The structure of the capacitor 1*a* will be described with reference to FIG. 8. Throughout FIGS. 8 to 14, x-, y-, and x-axes represent identical directions. In the integrated capacitor 1*a*, the plane along the opening of the case 60 is the xy-plane, the plane along the short side of the case 60 is the yz-plane, and the plane along the long side of the case 60 is the zx-plane.

Figure 8:
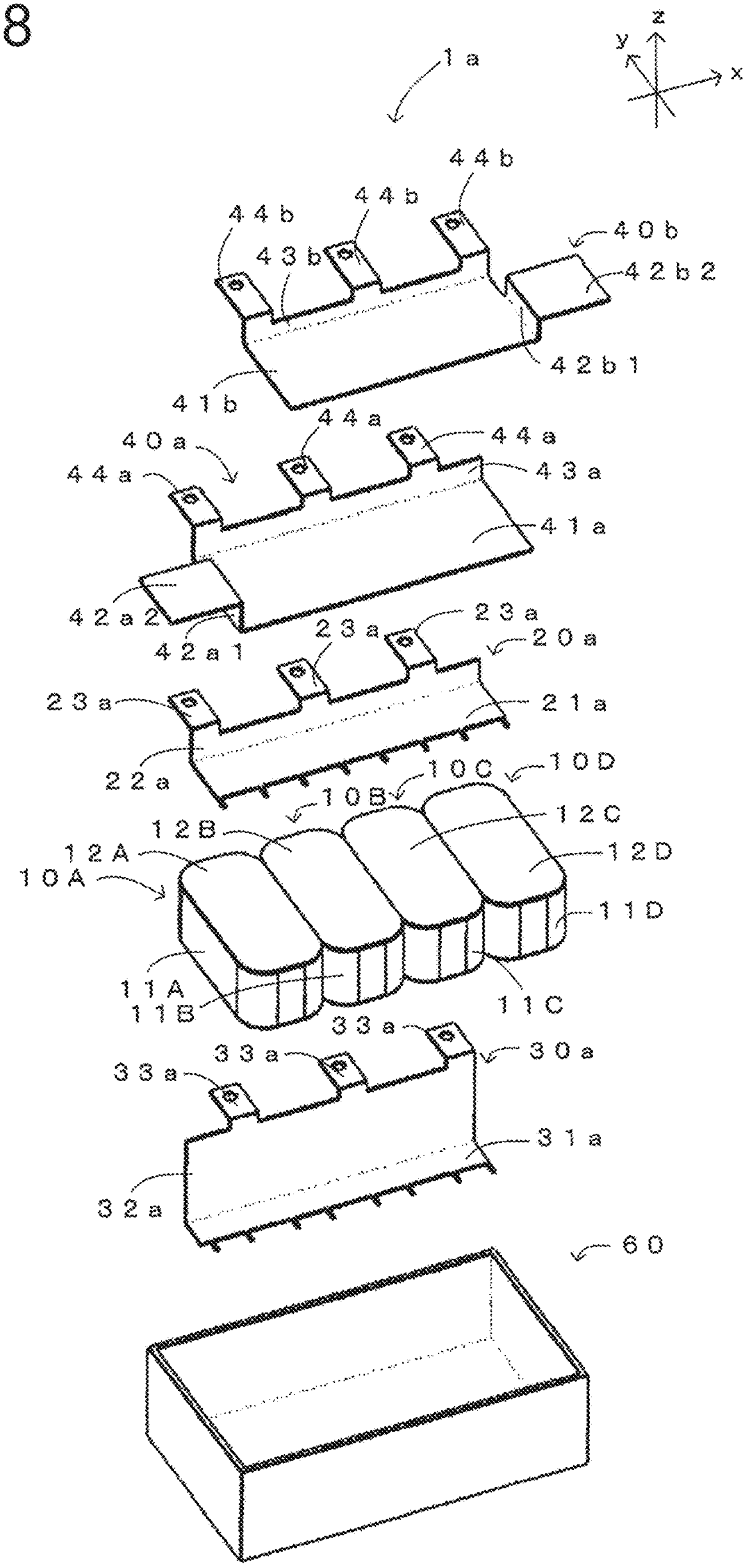
FIG. 8 is an exploded perspective view of a capacitor according to a second embodiment.
Figure 9:
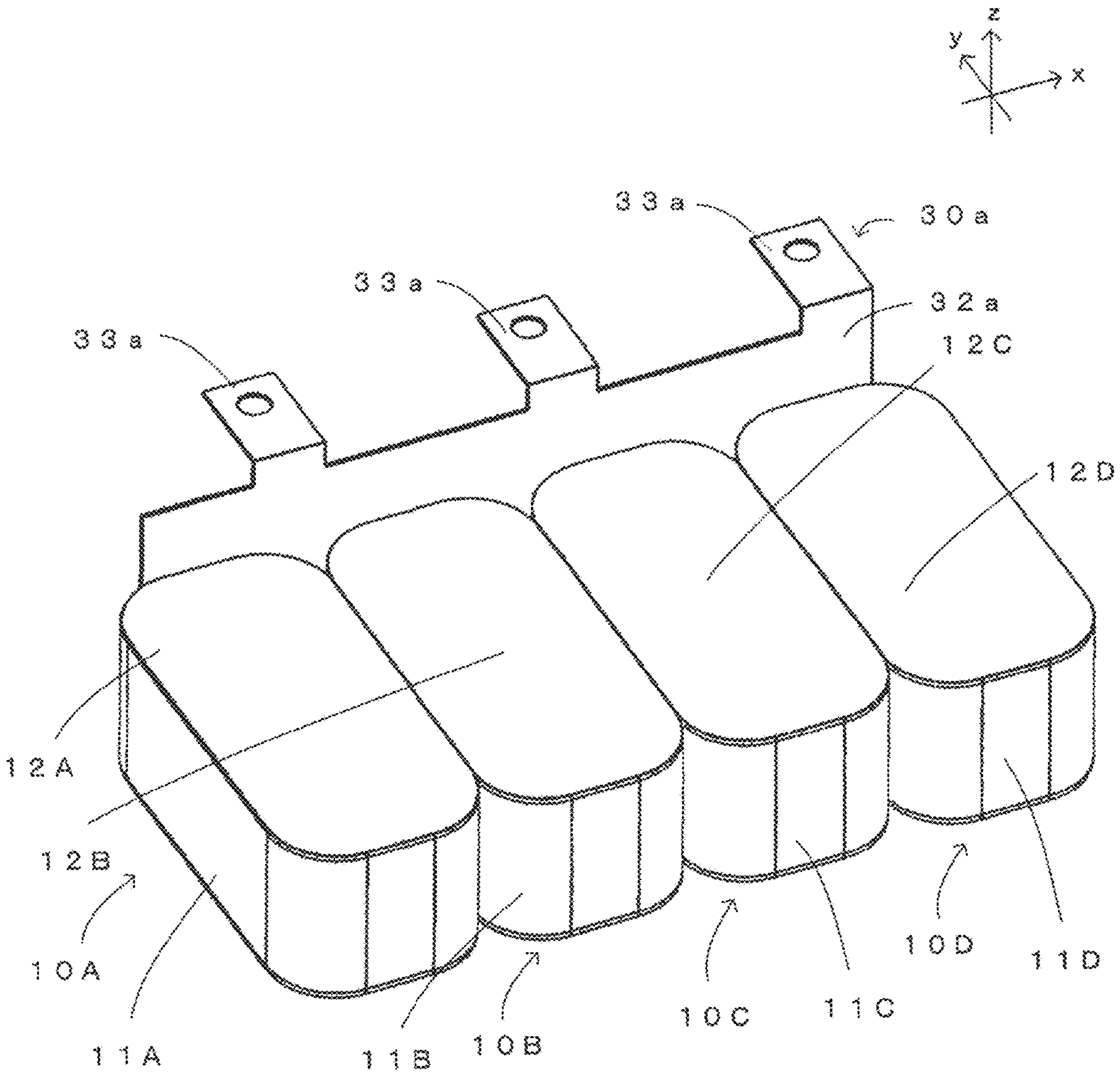
FIG. 9 is a perspective view of capacitor elements and a second bus bar of the capacitor according to the second embodiment.
Figure 10:
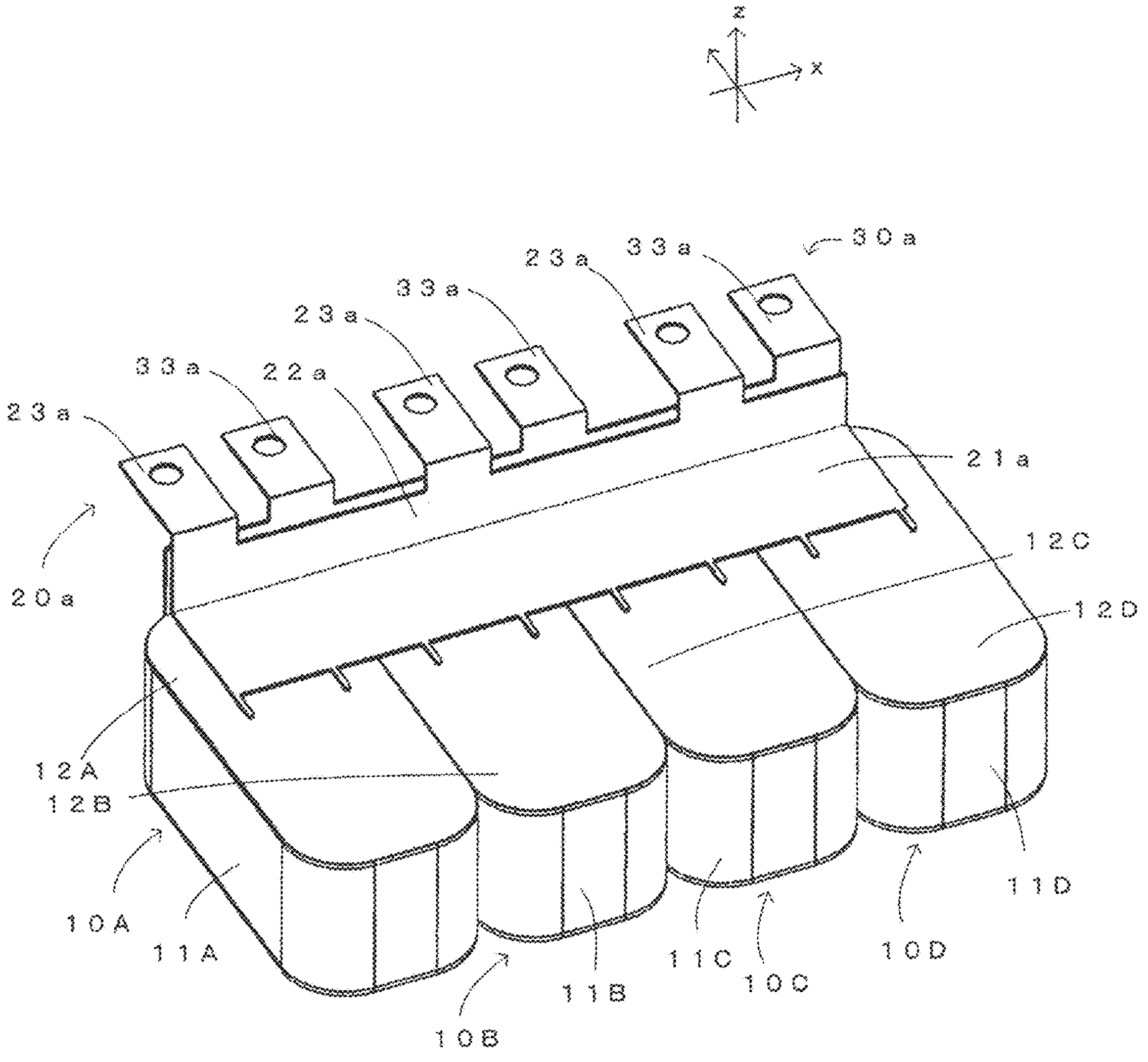
FIG. 10 is a perspective view of the capacitor elements, the second bus bar, and a first bus bar of the capacitor according to the second embodiment.
Figure 11:
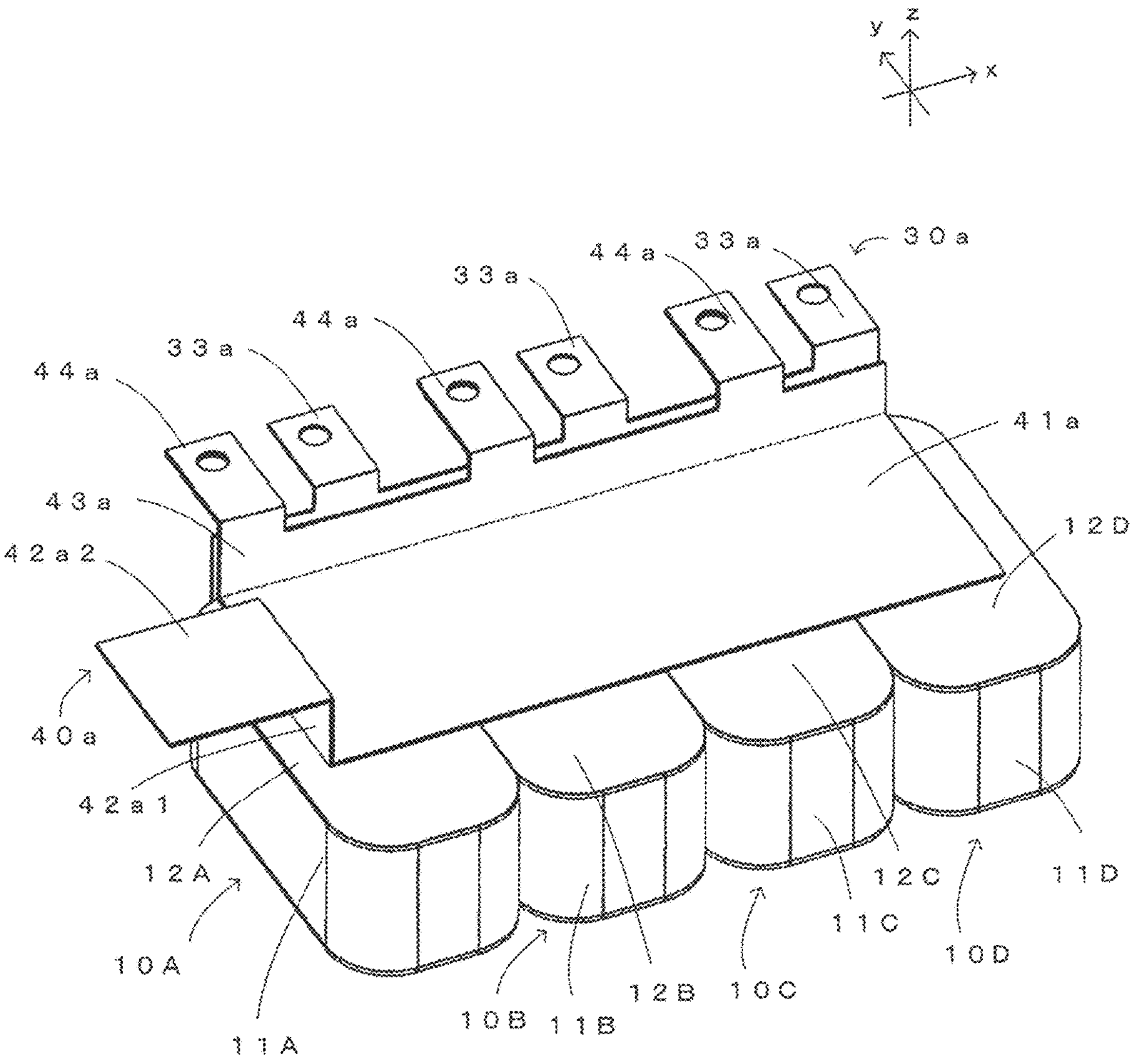
FIG. 11 is a perspective view of the capacitor elements, the second bus bar, the first bus bar, and a heat dissipating component of the capacitor according to the second embodiment.
Figure 12:
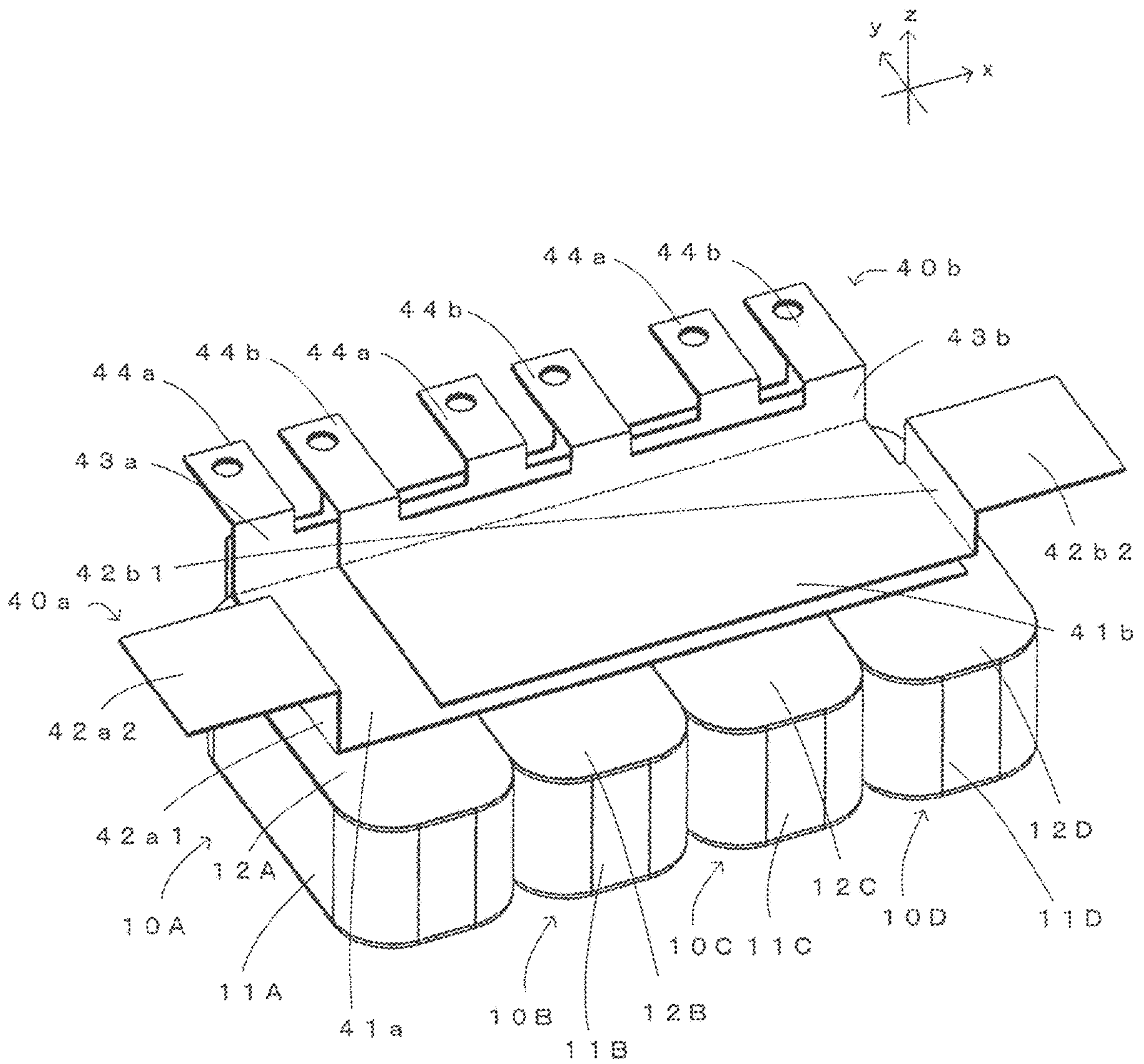
FIG. 12 is a perspective view of the capacitor elements, the second bus bar, the first bus bar, and two heat dissipating components of the capacitor according to the second embodiment.

As shown in FIG. 8, the capacitor 1*a* includes a plurality of (4 in the present embodiment) metallized film capacitor elements (capacitor elements) 10A, 10B, 10C, 10D, a first bus bar (first conductor) 20*a*, a second bus bar (second conductor) 30*a*, a heat dissipating component (third conductor) 40*a*, a heat dissipating component 40*b*, a filling resin part (sealing resin part) 50, and a case 60.

As shown in FIG. 8, the capacitor elements 10A, 10B, 10C, 10D have element body parts 11A, 11B, 11C, 11D, first end surface electrodes 12A, 12B, 12C, 12D, and second end surface electrodes (not shown). The first end surface electrodes 12A, 12B, 12C, 12D are formed at the first end surfaces of the element body parts 11A, 11B, 11C, 11D by spraying a metal such as zinc. The second end surface electrodes are formed at the second end surfaces of the element body parts 11A, 11B, 11C, 11D by spraying a metal such as zinc.

For the sake of convenience, the second end surface electrodes of the capacitor elements 10A, 10B, 10C, 10D will be referred to as the second end surface electrodes 13A, 13B, 13C, 13D. The element body part 11D is similarly structured as the element body parts 11A, 11B, 11C. Since the element body parts 11A, 11B, 11C are identical to those in the first embodiment, their description will not be repeated.

The four capacitor elements 10A to 10D are arranged in a matrix of front, rear, right, and left, having their circumferential surfaces opposed to that of adjacent one. In the present embodiment, four capacitor elements are arranged in the x-axis direction and one in the y-axis direction. In this state, by the first bus bar 20*a* being in contact with and soldered to the first end surface electrodes 12A to 12D, an electrical connection is established. By the second bus bar

30*a* being in contact with and soldered to the second end surface electrodes 13A to 13D, an electrical connection is established. The first bus bar 20*a* and the second bus bar 30*a* are made of a conductive material such as copper.

The first bus bar 20*a* has a flat plate-like end surface electrode contact part 21*a*. In the integrated capacitor 1*a*, the end surface electrode contact part 21*a* is in contact with the first end surface electrodes 12A to 12D to establish an electrical connection. The end surface electrode contact part 21*a* according to the present embodiment has a plurality of projecting parts. By soldering the plurality of projecting parts and the first end surface electrodes 12A to 12D to each other, the first bus bar 20*a* and the first end surface electrodes 12A to 12D are electrically connected to each other.

The first bus bar 20*a* has a flat plate-like rising part 22*a*. The rising part 22*a* is at one location in the y-axis positive-direction edge of the end surface electrode contact part 21*a*. The rising part 22*a* extends in the z-axis positive direction.

The first bus bar 20*a* has external connection terminal parts (first fastening part) 23*a*. The external connection terminal parts 23*a* extend in the y-axis positive direction from one end of the rising part 22*a* opposite to the end surface electrode contact part 21*a*.

The second bus bar 30*a* has a flat plate-like end surface electrode contact part 31*a*. In the integrated capacitor 1*a*, the end surface electrode contact part 31*a* is in contact with the second end surface electrodes 13A to 13D to establish an electrical connection.

By soldering the plurality of projecting parts of the end surface electrode contact part 31*a* and the second end surface electrodes 13A to 13D, the second bus bar 30*a* and the second end surface electrodes 13A to 13D are electrically connected to each other.

The second bus bar 30*a* has a flat plate-like rising part 32*a*. The rising part 32*a* is at one location in the y-axis positive-direction edge of the end surface electrode contact part 31*a*. The rising part 32*a* extends in the z-axis positive direction.

In the integrated capacitor 1*a*, the rising part 22*a* and the rising part 32*a* partially overlap with each other in a zx-plan view. In an xy-plan view, the rising part 22*a* is disposed on the y-axis negative side than the rising part 32*a* while insulated.

The second bus bar 30*a* has external connection terminal parts 33*a*. The external connection terminal parts 33*a* extend in the y-axis positive direction from three locations in the rising part 32*a* opposite to the end surface electrode contact part 31*a*.

In the integrated capacitor 1*a*, the y-axis negative-side surface of the rising part 32*a* and the y-axis positive-side surfaces of the capacitor elements 10A to 10D are opposed to each other. The z-axis positive-side surface of the end surface electrode contact part 31*a* is in contact with the z-axis negative-side surfaces of the second end surface electrodes 13A to 13D.

In the integrated capacitor 1*a*, the y-axis negative-side surface of the rising part 32*a* and the y-axis positive-side surface of the rising part 22*a* are opposed to each other. The first bus bar 20*a* is insulated from the second bus bar 30*a*. The second bus bar 30*a* is insulated from the heat dissipating component 40*a*.

In the integrated capacitor 1*a*, the heat dissipating component 40*a* is in contact with nowhere in the four capacitor elements 10A to 10D but is in contact with the first bus bar 20*a*. The heat dissipating component 40*a* is made of a conductive material such as copper.

The heat dissipating component 40*a* has an embedded part 41*a*. In the integrated capacitor 1*a*, the embedded part 41*a* is in contact with the z-axis positive-side surface of the end surface electrode contact part 21*a*. The embedded part 41*a* is quadrangular in an xy-plan view.

The heat dissipating component 40*a* has a rising part 42*al*. The rising part 42*al* is quadrangular in an xy-plan view. The rising part 42*al* extends in the z-axis positive direction from the x-axis negative-side edge of the embedded part 41*a*.

The heat dissipating component 40*a* has an exposed part 42*a*2. The exposed part 42*a*2 is quadrangular in an xy-plan view. The exposed part 42*a*2 extends in the x-axis negative direction from a location in the rising part 42*al* opposite to the embedded part 41*a*. The z-axis positive-side surface of the exposed part 42*a*2 is flat. That is, the z-axis positive-side surface of the exposed part 42*a*2 is parallel to an xy-plane.

The heat dissipating component 40*a* has a flat plate-like rising part 43*a*. The rising part 43*a* extends in the z-axis positive direction from one location in the y-axis positive-side edge of the embedded part 41*a*. In the integrated capacitor 1*a*, the rising part 22*a* and the rising part 43*a* partially overlap with each other in a zx-plan view.

The heat dissipating component 40*a* has external connection terminal parts (second fastening part) 44*a*. The external connection terminal parts 44*a* extend in the y-axis positive direction from three locations in the rising part 43*a* opposite to the embedded part 41*a*. In the integrated capacitor 1*a*, the external connection terminal parts 23*a* and the external connection terminal parts 44*a* partially overlap with each other in an xy-plan view.

In the integrated capacitor 1*a*, the heat dissipating component 40*a* has the rising part 43*a* disposed on the y-axis negative side than the y-axis negative-side surface of the rising part 22*a*. The heat dissipating component 40*a* has the z-axis negative-side surface of the embedded part 41*a* brought into contact with the z-axis positive-side surface of the end surface electrode contact part 21*a*. The z-axis negative-side surfaces of the external connection terminal parts 44*a* are in contact with the z-axis positive-side surfaces of the external connection terminal parts 23*a*. The heat dissipating component 40*a* is mounted on the first bus bar 20*a* having the external connection terminal parts 23*a* and the external connection terminal parts 44*a* fastened to each other, so that the external connection terminal parts 23*a* and the external connection terminal parts 44*a* overlap with each other in an xy-plan view. This improves the positioning accuracy of the z-axis positive-side surface of the exposed part 42*a*2 in the integrated capacitor 1*a*.

In the integrated capacitor 1*a*, the heat dissipating component 40*b* is in contact with nowhere in the four capacitor elements 10A to 10D. The heat dissipating component 40*b* is in contact with nowhere in the first bus bar 20*a* and the heat dissipating component 40*a*. The heat dissipating component 40*b* is made of a conductive material such as copper.

The heat dissipating component 40*b* has an embedded part 41*b*. In the integrated capacitor 1*a*, the embedded part 41*b* is disposed on the z-axis positive-side surface of the embedded part 41*a* while insulated." The embedded part 41*b* is quadrangular in an xy-plan view.

The heat dissipating component 40*b* has a rising part 42*b*1. The rising part 42*b*1 is quadrangular in a zx-plan view. The rising part 42*b*1 extends in the z-axis positive direction from the x-axis positive-side edge of the embedded part 41*b*.

The heat dissipating component 40*b* has an exposed part 42*b*2. The exposed part 42*b*2 is quadrangular in an xy-plan view. The exposed part 42*b*2 extends in the x-axis positive direction from a location in the rising part 42*b*1 opposite to the embedded part 41*b*. The z-axis positive-side surface of the exposed part 42*b*2 is flat. That is, the z-axis positive-side surface of the exposed part 42*b*2 is parallel to an xy-plane.

The heat dissipating component 40*b* has a flat plate-like rising part 43*b*. The rising part 43*b* extends in the z-axis positive direction from one location in the y-axis positive-side edge of the embedded part 41*b*. In the integrated capacitor 1*a*, the rising part 32*a* and the rising part 43*b* partially overlap with each other in a zx-plan view.

The heat dissipating component 40*b* has external connection terminal parts 44*b*. The external connection terminal parts 44*b* extend in the y-axis positive direction from three locations in the rising part 43*b* opposite to the embedded part 41*b*. In the integrated capacitor 1*a*, the external connection terminal parts 33*a* and the external connection terminal parts 44*b* partially overlap with each other in an xy-plan view.

In the integrated capacitor 1*a*, the rising part 43*b* is disposed on the y-axis negative side than the y-axis negative-side surface of the rising part 43*a*. The heat dissipating component 40*b* is disposed on the heat dissipating component 40*a* while insulated. The z-axis negative-side surfaces of the external connection terminal parts 44*b* are in contact with the z-axis positive-side surfaces of the external connection terminal parts 33*a*. In the integrated capacitor 1*a*, the heat dissipating component 40*b* is insulated from the first bus bar 20*a*. The heat dissipating component 40*b* is mounted on the second bus bar 30*a* having the external connection terminal parts 33*a* and the external connection terminal parts 44*b* fastened to each other, so that the external connection terminal parts 33*a* and the external connection terminal parts 44*b* overlap with each other in an xy-plan view. This improves the positioning accuracy of the z-axis positive-side surface of the exposed part 42*b*2 in the integrated capacitor 1*a*.

Figure 13:
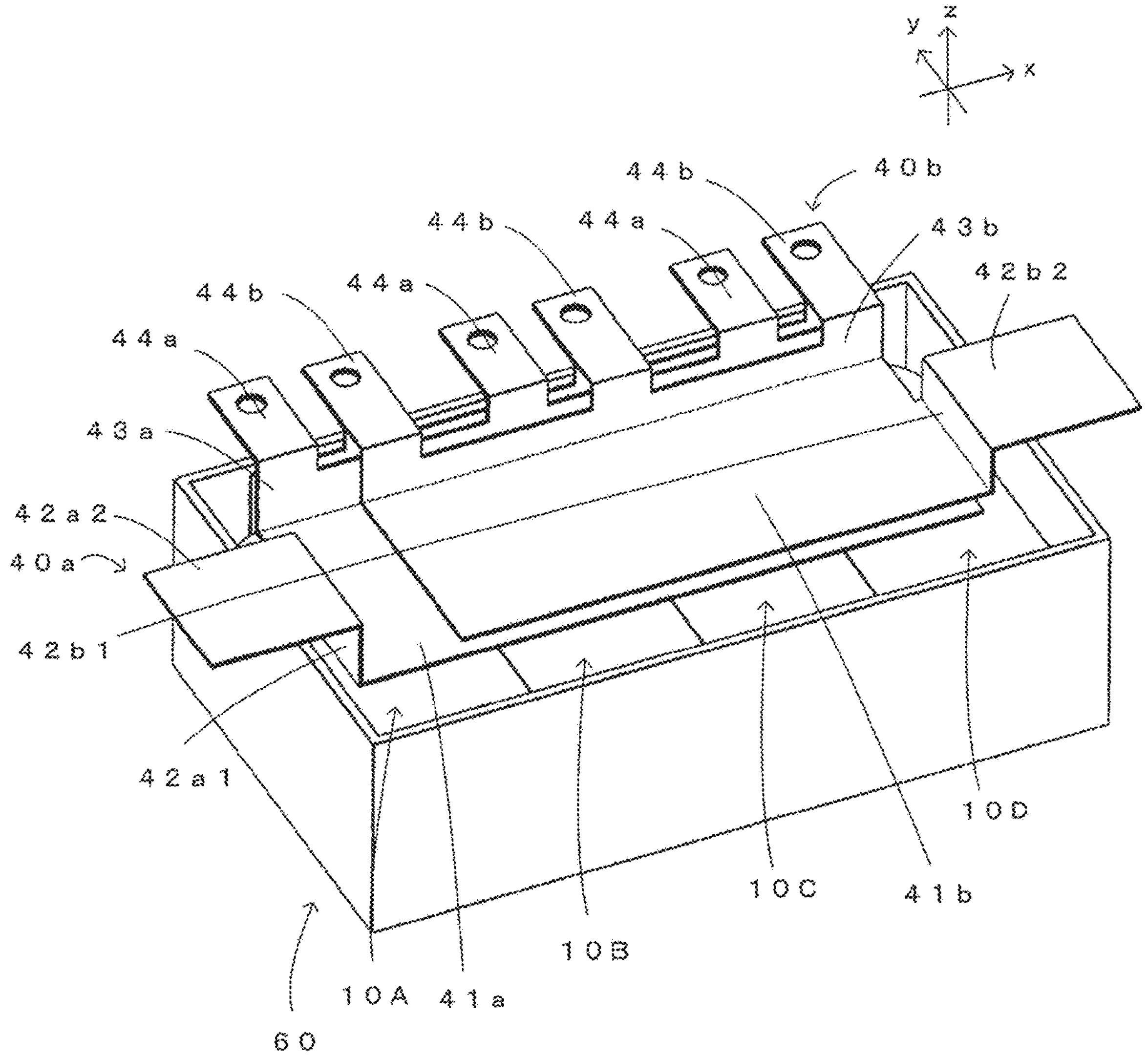
FIG. 13 is a perspective view of the capacitor elements, the second bus bar, the first bus bar, two heat dissipating components, and a case of the capacitor according to the second embodiment.
Figure 14:
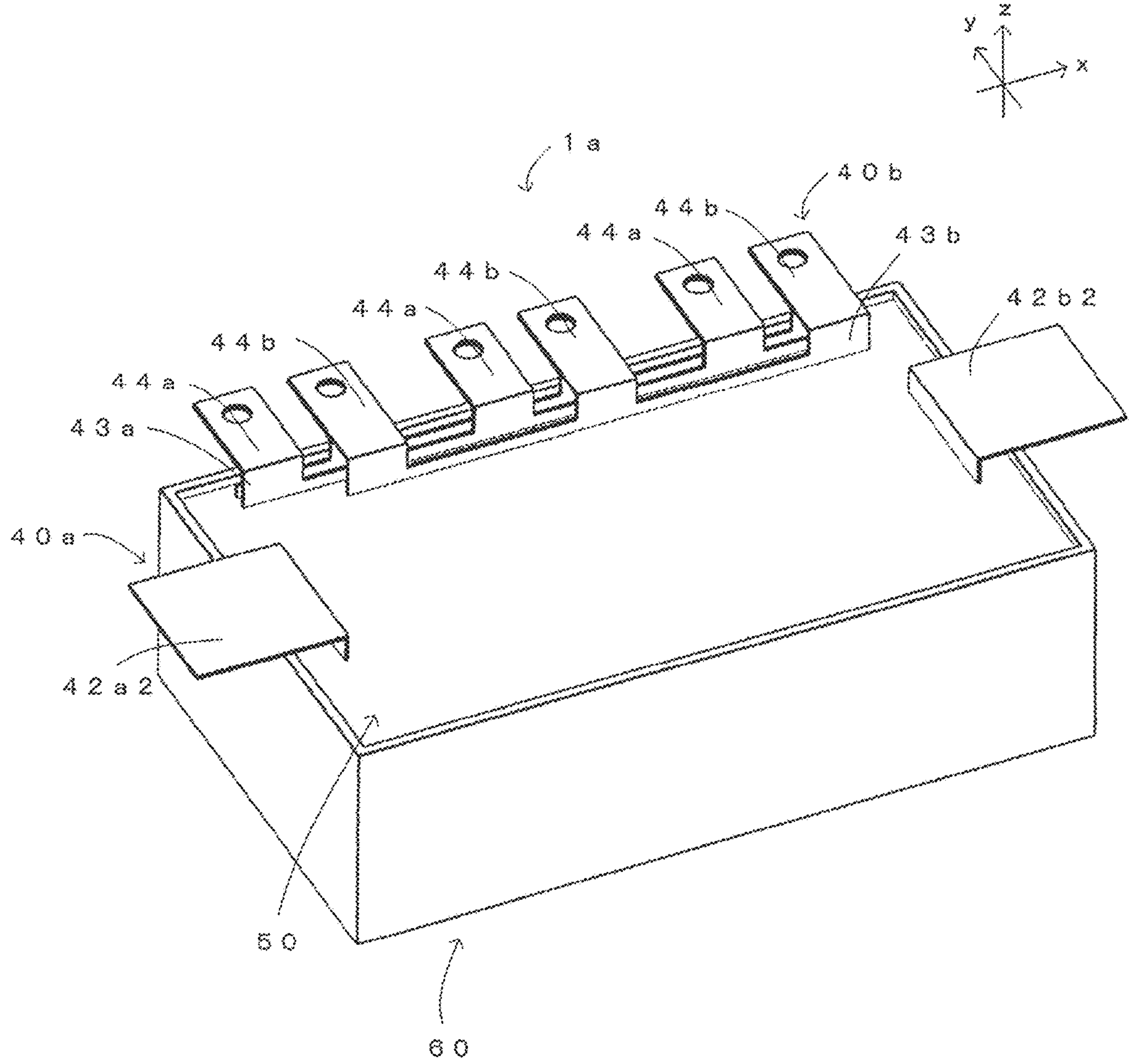
FIG. 14 is a perspective view of the capacitor elements, the second bus bar, the first bus bar, two heat dissipating component, the case, and a filling resin part of the capacitor according to the second embodiment.
Figure 15A:
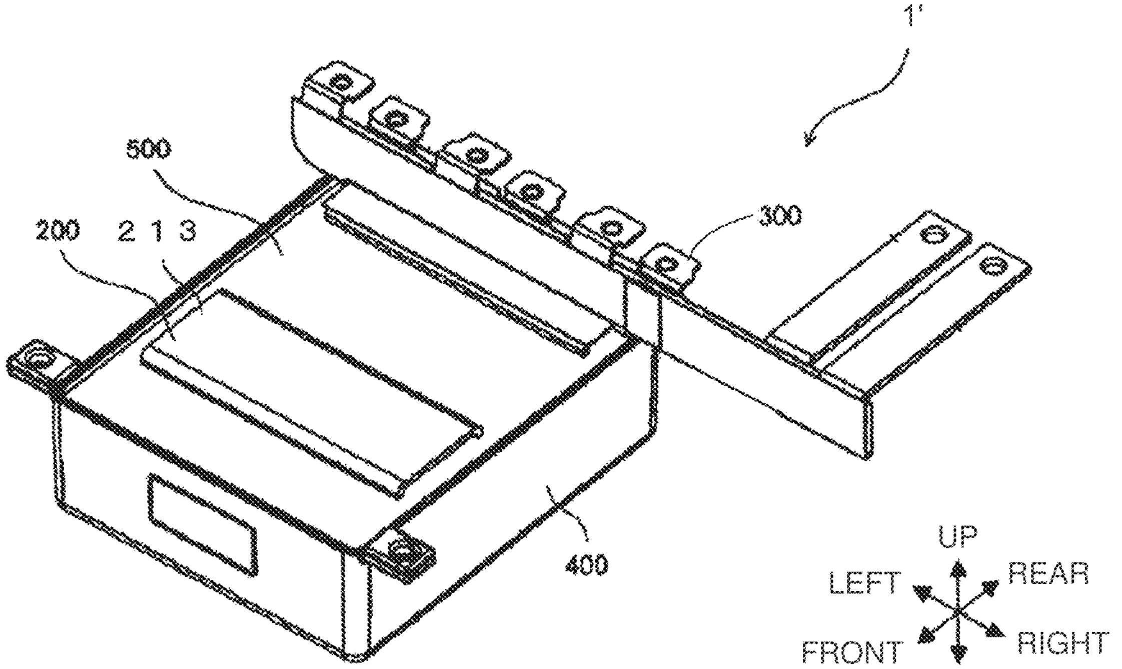
FIG. 15A is a perspective view of a conventional capacitor.
Figure 15B:
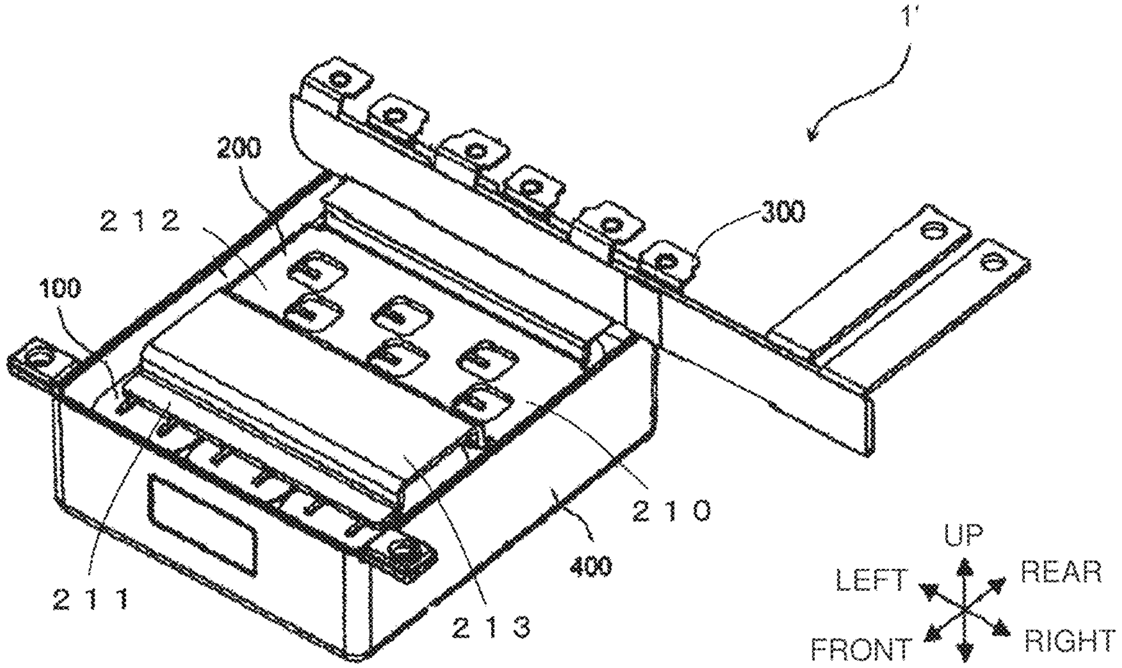
FIG. 15B is a is a perspective view of the capacitor in FIG. 15A without the filling resin.

As shown in FIGS. 13 and 14, the embedded part 41*a* and parts of the rising part 42*al* are embedded in the filling resin part 50. The exposed part 42*a*2 and the other parts of the rising part 42*al* are exposed outside the filling resin part 50. The embedded part 41*b* and parts of the rising part 42*b*1 are embedded in the filling resin part 50. The exposed part 42*b*2 and the other parts of the rising part 42*b*1 are exposed outside the filling resin part 50. For example, when the capacitor 1*a* is mounted on an external device, the cooling component of the external device abuts the flat surface of the exposed part 42*a*2 and the flat surface of the exposed part 42*b*2. The heat due to the energized capacitor 1*a* is transferred from the embedded parts 41*a*, 41*b* to the exposed parts 42*a*2, 42*b*2, and then to the cooling component abutting the exposed parts 42*a*2, 42*b*2.

In the following, with reference to FIGS. 9 to 14, the manufacturing process of the capacitor 1*a* is described. The following manufacturing process of the capacitor 1*a* is merely an example, and any assembly order may be employed so long as the capacitor 1*a* is ultimately brought into the state shown in FIG. 14.

First, the capacitor elements 10A to 10D are disposed from the z-axis positive side on the y-axis negative side than the y-axis negative-side surface of the rising part 32*a*. Here, the z-axis negative-side surfaces of the second end surface electrodes 13A to 13D are in contact with the z-axis positive-side surface of the end surface electrode contact part 31*a* to enter the state shown in FIG. 9. The second end surface electrodes 13A to 13D and the end surface electrode contact part 31*a* are electrically connected to each other by soldering, for example.

Next, the first bus bar 20*a* is disposed from the z-axis positive side. Here, the rising part 22*a* is positioned on the y-axis negative side than the y-axis negative-side surface of the rising part 32*a*. The z-axis negative-side surface of the end surface electrode contact part 21*a* is in contact with the z-axis positive-side surfaces of the first end surface electrodes 12A to 12D but not with the second bus bar 30*a*. This achieves the state shown in FIG. 10. Then, the first end surface electrodes 12A to 12D and the end surface electrode contact part 21*a* are electrically connected to each other by soldering, for example.

Next, the heat dissipating component 40*a* is disposed from the z-axis positive side so that the rising part 43*a* is positioned on the y-axis negative side than the y-axis negative-side surface of the rising part 22*a*. Here, the z-axis negative-side surface of the embedded part 41*a* is in contact with the z-axis positive-side surface of the end surface electrode contact part 21*a*. The z-axis negative-side surfaces of the external connection terminal parts 44*a* are in contact with the y-axis positive-side surfaces of the external connection terminal parts 23*a*. This achieves the state shown in FIG. 11. In this state, the external connection terminal parts 23*a* and the external connection terminal parts 44*a* are fastened to each other.

Next, the heat dissipating component 40*b* is disposed from the z-axis positive side having the heat dissipating component 40*b* insulated from the heat dissipating component 40*a*, so that the rising part 43*b* is positioned on the y-axis negative side than the y-axis negative-side surface of the rising part 43*a*. Here, the z-axis negative-side surfaces of the external connection terminal parts 44*b* are in contact with the y-axis positive-side surfaces of the external connection terminal parts 33*a*. This achieves the state shown in FIG. 12. In this state, the external connection terminal parts 33*a* and the external connection terminal parts 44*b* are fastened to each other.

The integrated capacitor elements 10A to 10D, second bus bar 30*a*, first bus bar 20*a* and heat dissipating components 40*a*, 40*b* are disposed in the case 60 from the z-axis positive side. Here, the z-axis negative-side surface of the end surface electrode contact part 31*a* is opposed to the bottom surface of the case 60 with a predetermined clearance. This achieves the state shown in FIG. 13.

In the state shown in FIG. 13, liquid epoxy resin is poured into the case 60 from its opening and is cured at a predetermined curing temperature. This completes the capacitor 1*a* shown in FIG. 14.

The second embodiment achieves similar effects as the first embodiment.

Various design changes can be made with the aforementioned structures within the matters recited in the scope of claims.

For example, while the embedded part 41A, the projecting part 42A, the embedded part 41B, the projecting part 42B, and the embedded part 41C are sequentially positioned from the y-axis positive side toward the y-axis negative side in an xy-plan view in the first embodiment, the present invention is not limited thereto. For example, the embedded part, the projecting part, and the embedded part may be sequentially positioned from the y-axis positive side toward the y-axis negative side in an xy-plan view. The embedded part, the projecting part, the embedded part, the projecting part, the embedded part, the projecting part, and the embedded part may be sequentially positioned from the y-axis positive side toward the y-axis negative side in an xy-plan view. Thus, the number of the embedded parts and that of the projecting parts are not specified.

For example, the embedded part, the projecting part, the embedded part, and the projecting part may be sequentially positioned from the y-axis positive side toward the y-axis negative side in an xy-plan view. The projecting part, the embedded part, the projecting part, and the embedded part may be sequentially positioned from the y-axis positive side toward the y-axis negative side in an xy-plan view. The projecting part, the embedded part, and the projecting part may be sequentially positioned from the y-axis positive side toward the y-axis negative side in an xy-plan view. In this manner, the exposed part may be positioned at the end.

While the description has been given exemplarily of the capacitor 1 having the case 60 in the first and second embodiments, the present invention is not limited thereto. The present invention is applicable to a capacitor without the case 60 but with the structures according to the embodiments.

In the first embodiment, the z-axis positive-side surface (first bus bar's opposed surface) of the end surface electrode contact part 21 of the first bus bar 20 and the z-axis negative-side surfaces (third bus bar's opposed surfaces) of the embedded parts 41A to 41C of the third bus bar 40 are in contact with each other. The present invention is not limited thereto. The first bus bar's opposed surface and the third bus bar's opposed surfaces may not be in contact with each other. In this case, the first bus bar's opposed surface and the third bus bar's opposed surfaces are preferably close to each other while avoiding hindering heat dissipation. Preferably, the distance in z-axis positive and negative distance between the first bus bar's opposed surface and the third bus bar's opposed surfaces is equal to or less than 1.0 mm.

In the second embodiment, the z-axis positive-side surface (first bus bar's opposed surface) of the end surface electrode contact part 21*a* of the first bus bar 20*a* and the z-axis negative-side surface (heat dissipating component's opposed surface) of the embedded part 41*a* of the heat dissipating component 40*a* are in contact with each other. The present invention is not limited thereto. The first bus bar's opposed surface and the heat dissipating component's opposed surface may not be in contact with each other. In this case, the first bus bar's opposed surface and the heat dissipating component's opposed surface are preferably close to each other while avoiding hindering heat dissipation. Preferably, the distance in z-axis positive and negative distance between the first bus bar's opposed surface and the heat dissipating component's opposed surface is equal to or less than 1.0 mm.

The structures described in the embodiments or variations may be combined as appropriate.

The present invention is widely applicable to capacitors having a heat dissipating structure.

REFERENCE SIGNS LIST

1: capacitor
10A, 10B, 10C: capacitor element
12A, 12B, 12C: first end surface electrode
13A, 13B, 13C: second end surface electrode
20: first bus bar (first conductor)
21: end surface electrode contact part
23, 25: external connection terminal part (first fastening part)
30: second bus bar (second conductor)
40: third bus bar (third conductor)
41A, 41B, 41C: embedded part (embedded part)
42A, 42B: projecting part (exposed part)
44, 46: external connection terminal part (second fastening part)
50: filling resin part (sealing resin part)
60: case.

The invention claimed is:

1. A capacitor, comprising:
a plurality of capacitor elements each including
a first end surface electrode positioned on a first end surface and corresponding to a first polarity, and
a second end surface electrode positioned on a second end surface and corresponding to a second polarity;
a first conductor in contact with and electrically connected to the first end surface electrode;
a second conductor in contact with and electrically connected to the second end surface electrode;
a third conductor adjacent to and electrically connected to the first conductor, the third conductor including
an embedded part positioned in a first section that overlaps with the first conductor in a plan view seen from the first end surface electrode toward the second end surface electrode, and
an exposed part positioned in a second section separate from the first section; and
a sealing resin part sealing the plurality of capacitor elements, the first conductor, and the second conductor, the sealing resin part sealing the third conductor to embed the embedded part and expose the exposed part.

2. The capacitor according to claim 1, wherein
the first conductor includes a first fastening part, and
the third conductor includes a second fastening part fastened to the first fastening part.

3. A capacitor, comprising:
a plurality of capacitor elements each including
a first end surface electrode positioned on a first end surface and corresponding to a first polarity, and
a second end surface electrode positioned on a second end surface and corresponding to a second polarity;
a first conductor in contact with and electrically connected to the first end surface electrode, the first conductor including a first fastening part;
a second conductor in contact with and electrically connected to the second end surface electrode;
a third conductor adjacent to the first conductor, the third conductor including
an embedded part positioned in a first section that overlaps with the first conductor in a plan view seen from the first end surface electrode toward the second end surface electrode,
an exposed part positioned in a second section separate from the first section, and
a second fastening part fastened to the first fastening part; and
a sealing resin part sealing the plurality of capacitor elements, the first conductor, and the second conductor, the sealing resin part sealing the third conductor to embed the embedded part and expose the exposed part.

* * * * *